(12) United States Patent
Vormezeele et al.

(10) Patent No.: US 8,245,982 B2
(45) Date of Patent: Aug. 21, 2012

(54) WING

(75) Inventors: Alexandre Vormezeele, Pauwelslei (BE); Christophe Cnop, Mechelen (BE); Dietmar Bloemen, Tielt-Winge (BE); Eoin O'Beirne, Grimbergen (BE)

(73) Assignee: Asco Industries, Zaventem (BE)

( * ) Notice: Subject to any disclaimer, the term of this patent is extended or adjusted under 35 U.S.C. 154(b) by 92 days.

(21) Appl. No.: 12/449,886

(22) PCT Filed: Mar. 7, 2008

(86) PCT No.: PCT/EP2008/052797
§ 371 (c)(1),
(2), (4) Date: Mar. 11, 2010

(87) PCT Pub. No.: WO2008/110521
PCT Pub. Date: Sep. 18, 2008

(65) Prior Publication Data
US 2010/0163685 A1  Jul. 1, 2010

(30) Foreign Application Priority Data

Mar. 9, 2007 (EP) .................................. 07103891
Mar. 21, 2007 (EP) .................................. 07104630

(51) Int. Cl.
*B64C 3/50* (2006.01)
(52) U.S. Cl. .......................... 244/214; 244/216; 244/219
(58) Field of Classification Search .................. 244/214, 244/215, 216, 17.11, 17.19
See application file for complete search history.

(56) References Cited

U.S. PATENT DOCUMENTS

| | | | | |
|---|---|---|---|---|
| 4,399,970 A | * | 8/1983 | Evans | 244/214 |
| 4,470,569 A | * | 9/1984 | Shaffer et al. | 244/214 |
| 4,650,140 A | * | 3/1987 | Cole | 244/214 |
| 5,544,847 A | * | 8/1996 | Bliesner | 244/214 |
| 2007/0102587 A1 | * | 5/2007 | Jones et al. | 244/214 |
| 2009/0001224 A1 | * | 1/2009 | Perez-Sanchez | 244/214 |
| 2009/0072093 A1 | * | 3/2009 | Fox et al. | 244/214 |
| 2009/0272853 A1 | * | 11/2009 | Raudszus et al. | 244/214 |
| 2009/0302168 A1 | * | 12/2009 | Hetrick et al. | 244/214 |
| 2010/0025537 A1 | * | 2/2010 | Wheaton et al. | 244/214 |
| 2011/0024575 A1 | * | 2/2011 | Wheaton et al. | 244/214 |

FOREIGN PATENT DOCUMENTS

WO  WO97/49607  12/1997
WO  WO2005/108205  11/2005

OTHER PUBLICATIONS

International Search Report in PCT/EP2008/052797 dated Jun. 10, 2008 (3 pages).
Written Opinion in PCT/EP2008/052797 (9 pages).

* cited by examiner

*Primary Examiner* — Timothy D Collins
*Assistant Examiner* — Medhat Badawi
(74) *Attorney, Agent, or Firm* — McCracken & Frank LLC

(57) ABSTRACT

A wing, comprising a structure, an outer skin, and a leading edge device comprising a moveable body with a leading and a trailing edge and a support and actuation mechanism for attaching said moveable body to a structure of a wing and guiding a substantially circular motion of said moveable body, around a hinge line, between a retracted position and at least one deployed position. Said leading edge device further comprises at least one guiding device comprising a track and a follower with a roller. The track follows a substantially circular arc substantially centered on the hinge line. The roller is arranged to be guided by the track and hold down said moveable aerodynamic surface so as to substantially restrict lift-off of its trailing edge from the outer skin of the wing.

19 Claims, 28 Drawing Sheets

WING

The present invention relates to a wing comprising a structure, an outer skin and a leading edge device, wherein said wing leading edge device comprises a moveable aerodynamic body and a support and actuation mechanism. In particular, it relates to a wing wherein said wing leading edge device comprises a moveable body with a leading and a trailing edge and a support and actuation mechanism, comprising a plurality of arms with a first extremity, a second extremity, a hinge near said first extremity for pivotally attaching the arm to said wing structure, and attached to said moveable body near said second extremity, wherein said hinges of said plurality of arms are substantially aligned along a hinge line, for attaching said moveable body to a structure of a wing and driving a circular motion of said moveable body, around said hinge line, between a retracted position and at least one deployed position.

Wing leading and trailing edge devices with moveable bodies are generally known in the field of airplanes, and particularly transport airplanes, as means to generate the necessary lift at low speeds in order to achieve take-off, climb, approach and landing performances. These devices must be designed such that the targets for runway length for take-off and landing, climb performance and approach speed are met. The choice of configuration must be made for an ideal balance between optimal $C_{Imax}$ (maximum lift coefficient) and L/D ratio (lift over drag). There are many parameters to consider such as noise and flight attitude. The flight attitude is important for safe approaches and there are limitations in terms of runway clearance with the tail of the aircraft (linked to the landing gear length . . . ). The noise performance requirements are defined by the noise print the airplane generates around the airport during departure and arrival stages. The allowed levels are defined in function of location with respect to a given airport. If for a given thrust the airplane climbs faster it will be further away from the measuring points surrounding the airport area, thus reducing the noise.

In order to meet those requirements several types of moveable wing leading edge devices have been proposed.

One of these devices, generally known as a drooped leading edge flap, or droop nose, is disclosed in International Patent Application WO 2005/108205 A1. In such a droop nose leading edge device 5, as illustrated in FIGS. 1-3, a droop nose body 6, placed at the leading edge of a wing 1, is moveable between a retracted position and a deployed position in which the droop nose body 6 is turned nose down. At high angles of attack, this better aligns the leading edge of the deployed droop nose body 6 with the airflow, reducing the acceleration of the airflow around it and thus the leading edge suction peak.

As a result, droop noses have an advantage over conventional slats in terms of drag. Although there is a $C_{Lmax}$ penalty, the use of droop noses results in a higher L/D ratio. This affects the climb rate at a given power resulting in a quicker gain of altitude. Furthermore droop noses reduce the noise induced by the large gap typical of slotted slat designs.

The kinematics of a droop nose leading edge device 5 are such that the trailing edge 15 of the droop nose body 6 should maintain contact with the outer skin 16 of the fixed leading edge of the wing 1 during the deployment. A droop nose body 6 is generally supported by a plurality of support arms 8*a*,8*b*, of which some are actuation arms 8*a* and some are undriven support arms 8*b*, as illustrated in FIG. 1. The actuation arms 8*a* and undriven support arms 8*b*, illustrated respectively in FIGS. 2 and 3, have a simple rotational movement around a physical hinge line 9*a* formed by the hinges 9 in the fixed leading edge. To deploy and retract the droop nose body 6, said droop nose body 6 is driven by a rotary actuator coupled to a lever 13 and link 14 assembly, which drives each actuation arm 8*a* around a hinge 9.

A drawback of this prior art device is that loss in lift and increase in drag result when the step formed by the thickness of the trailing edge 15 of the droop nose body 6 and the gap between the trailing edge 15 of the droop nose body 6 and the outer skin 16 of the fixed leading edge of the wing 1, exceeds a desired value.

In particular when the droop nose body 6 is deployed, an aerodynamic forward pitching moment is reacted low on the structure of the wing 1 through the attachment linkage 11 to the hinged support arm 8*a*, 8*b*. This causes a small elongation of the linkage 11 and deformation of the support arms 8*a*,8*b*, as well as of the linking elements between the support arms 8*a*,8*b*, the linkage 11 and the droop nose body 6, yielding a few millimetres of trailing edge lift off. This gap can be further increased by deformation of the droop nose 6 itself, as well as the difference in both chord- and spanwise deformations of the wing 1 and the droop nose body 6.

Another prior art moveable wing leading edge device is the sealed slat, as was disclosed in U.S. Pat. No. 5,544,847. Sealed slats are similar to droop noses, but have different support and actuation mechanisms. The sealed slat body is mounted on support tracks actuated through a rack and pinion mechanism. In general the sealed slat body is designed to have its trailing edge portion in contact with the wing in the retracted setting (cruise) and in an intermediate setting (take-off/climb), while there is a intended gap between the slat body and the fixed wing leading edge in the fully deployed condition of the slat.

Each support track is shaped following a circular arc centred on a virtual hinge point below the wing profile, wherein the virtual hinge points of the tracks supporting a sealed slat body form a hinge line around which the sealed slat body is rotated during deployment and retraction. Due to its hinge line being located below the wing, as opposed to the hinge line of the droop nose body, which is located inside the wing, the sealed slat body has a bigger fowler motion, and the underside of the slat extends away from the wing, thus creating a large gap on the wing underside.

Several types of sealed slats are known:

A first type of sealed slat comprises pitch controlling auxiliary arms. The slat is pivotally connected to the rack/pinion actuated tracks, for example with a single pin connection. To achieve the aerodynamic requirement of slat body trailing edge contact in the intermediate slat setting and gap between the slat body trailing edge and the wing outer skin in the fully deployed slat setting, an auxiliary arm is mounted next to the track and controls the pitch movement of the slat body. The auxiliary arm rolls in an auxiliary track formed by a shaped slot in the wing, wherein this shaped slot follows a curve different from that of the support tracks, thus commanding a relative pitching movement of the sealed slat body with respect to the support tracks.

Another embodiment of the sealed slat, disclosed in U.S. Pat. No. 5,544,847, has no auxiliary tracks but achieves the same contact at intermediate setting and gap at fully deployed setting. The slat is mounted fixedly to the circular tracks and has no pitching degree of freedom. The hinge point and fixed wing profile are defined in such a way as to attain aerodynamic requirements.

At the settings where contact between the trailing edge and the wing is required, it is also important to limit the lift off and hold the trailing edge in contact with the wing outer skin in between stations.

Another drawback of existing sealed slat concepts is flutter. In case of a seal applied between the fixed leading edge portion and the slat body, the pressure at the underside of the slat body may cause it to lift off and lose the sealing function. As a consequence the pitching moment on the slat body decreases and its trailing edge drops down, restoring the seal. This turns into a repeating cycle, causing an aerodynamic instability or flutter.

The problem addressed by the present invention is thus that of avoiding lift-off of the trailing edge of the moveable body of a wing leading edge device from the outer skin of the wing. Such lift-off may be caused by aerodynamic forward pitching moments on the moveable body as well as by absolute and relative span- and chordwise deformations of the moveable body and the wing.

This problem is solved by at least one guiding device comprising a track and a follower, such as a roller, for cooperating with said track, wherein one of the track and the follower is fixed to a structural member of the wing, whereas the other one of the track and the follower is fixed to the moveable body, and the arm is arranged to be guided by the track along a circular arc centred on the hinge line and hold down said moveable body so as to substantially restrict lift-off of its trailing edge from an outer skin of the wing in at least one of said positions. Such a device substantially prevents movement of the trailing edge perpendicularly to the outer skin while allowing the deploying and retracting motion of the moveable body. The wing leading edge device thus forms a droop nose device with a particularly advantageous L/D ratio that will not be impaired by substantial lift-off of the droop nose body trailing edge and the resulting loss in lift, higher drag and noise generation.

Advantageously, said other one of the track and the follower of the guiding device may be fixed to said moveable body closer to its trailing edge than to its leading edge. This bypasses the deformation of all elements leading to the trailing edge, allowing a better restraint of its lift-off from the wing outer skin. Furthermore, such a position increases the leverage of the guiding device against any aerodynamic forward pitching moment, thus allowing the guiding device to be more lightly dimensioned, resulting in a significant weight saving.

Advantageously, at least one of said plurality of arms may be integrally formed with at least part of said moveable body, such as a rib. Such an arrangement results in a simple and robust attachment of the moveable body to the support and actuation mechanism.

Advantageously, at least one of said plurality of arms may be linked to said moveable body with a single point attachment comprising a single attachment point, preferably with a spherical bearing. Such an arrangement results in a comparatively simple and robust attachment of the moveable body to the support and actuation mechanism with some adjustment to deformation and manufacturing tolerances.

Advantageously, at least one of said plurality of arms may be linked to said moveable body with an attachment comprising two eccentrically adjustable pins. Such an attachment remains comparatively simple, while providing the possibility of significant adjustment to compensate for manufacturing tolerances, is also suitable to take up part of any pitching moment acting on the moveable body, reducing the load on the guiding device.

Advantageously, at least one of said plurality of arms may be linked to said moveable body with a three-point attachment comprising a linkage, a first attachment point between said arm and said linkage, a second attachment point between said linkage and said moveable body and a third attachment point between said arm and said moveable body. Such an arrangement provides for the transmission of at least part of any pitching moment acting on the moveable body, reducing the load on the guiding device.

Also advantageously, said follower of the guiding device may be fixed to said moveable body and said track of the guiding device be arranged to be fixed to said wing structure. Keeping a fixed track and a moveable follower, in particular in form of a roller, allows a more compact arrangement of the guiding device.

Also advantageously, said track of the guiding device may be fixed to said wing structure under said outer skin and said follower of the guiding device traverse said outer skin through a cut-out in said outer skin, preferably sealed, for example with a spring loaded door seal or a sliding curtain seal. Mounting the track under the outer skin reduces the drag in the deployed position. Sealing the cut-out, for example with a spring loaded door seal or a sliding curtain seal, further decreases the drag while having the additional advantage of preventing the ingress of foreign objects and dust through the cut-out.

Advantageously, said follower may comprise a roller, mounted on an eccentric bushing, so as to be able to adjust the position of a rotation axis of said roller in order to compensate for play in the guiding device.

Advantageously, said follower may comprise a roller with a rotation axis pivotable around at least one perpendicular axis in order to compensate for angular misalignments in the guiding device.

The present invention also relates to a wing comprising a wing leading edge device comprising a moveable body with a leading and a trailing edge, a support and actuation mechanism, and at least one guiding device, wherein said support and actuation mechanism comprises a plurality of support tracks in substantially parallel planes, each support track being substantially rigidly attached to said moveable body to support and guide said moveable body in a motion between a retracted position and at least one deployed position with respect to a wing structure, and said guiding device comprises a track and a follower, such as a roller, wherein one of the track and the follower is arranged to be fixed to said wing structure, whereas the other one of the track and the follower is fixed to said moveable body, and the follower is arranged to be guided by the track in a plane substantially parallel to the planes of the support tracks.

In such a wing leading edge device, the difference in both chord and spanwise deformation of the wing and the moveable body between the support tracks could lead to local lift-off of the trailing edge. To solve this problem, said guiding device is located substantially offset between the planes of the support tracks, enabling a reduction of the lift-off, as the guiding device will hold down the moveable body between support tracks.

The invention will now be described illustratively, but not restrictively, with reference to the following figures.

Figure 1:
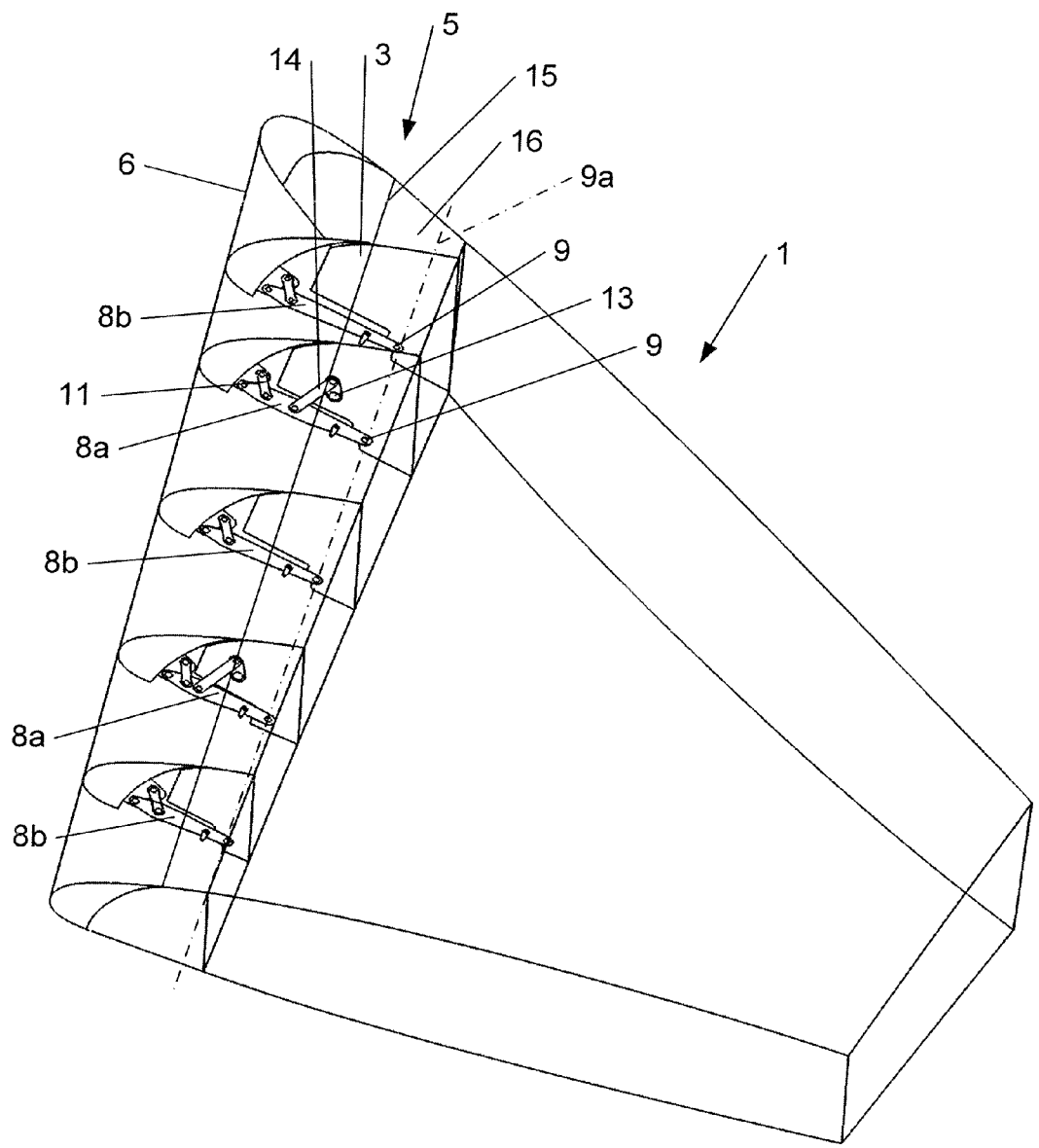
FIG. 1 is a perspective view of a droop nose leading edge device placed at the leading edge of a wing as known in the prior art.
Figure 2:
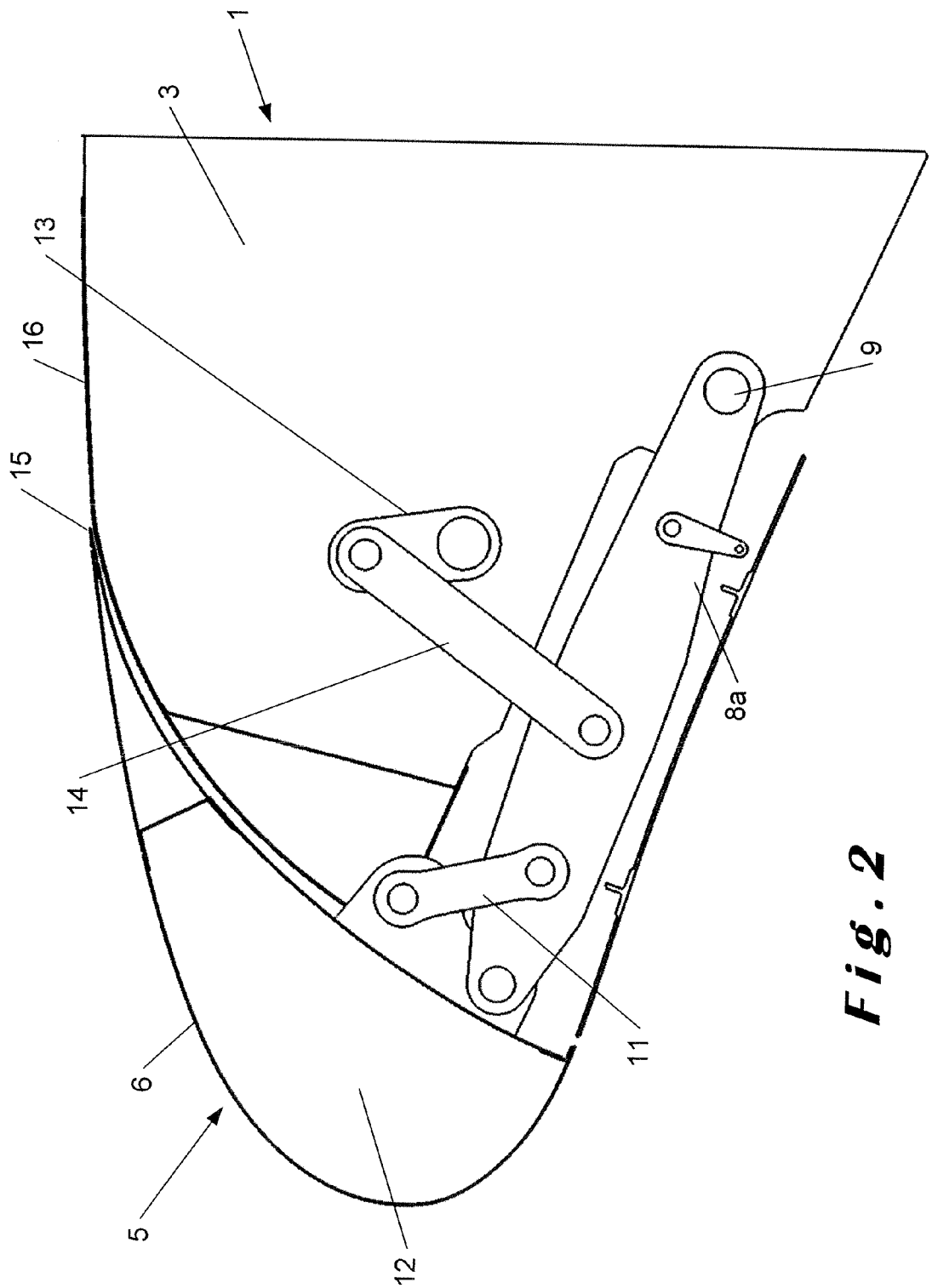
FIG. 2 is a detail view of a droop nose device of FIG. I with an actuation arm.
Figure 3:
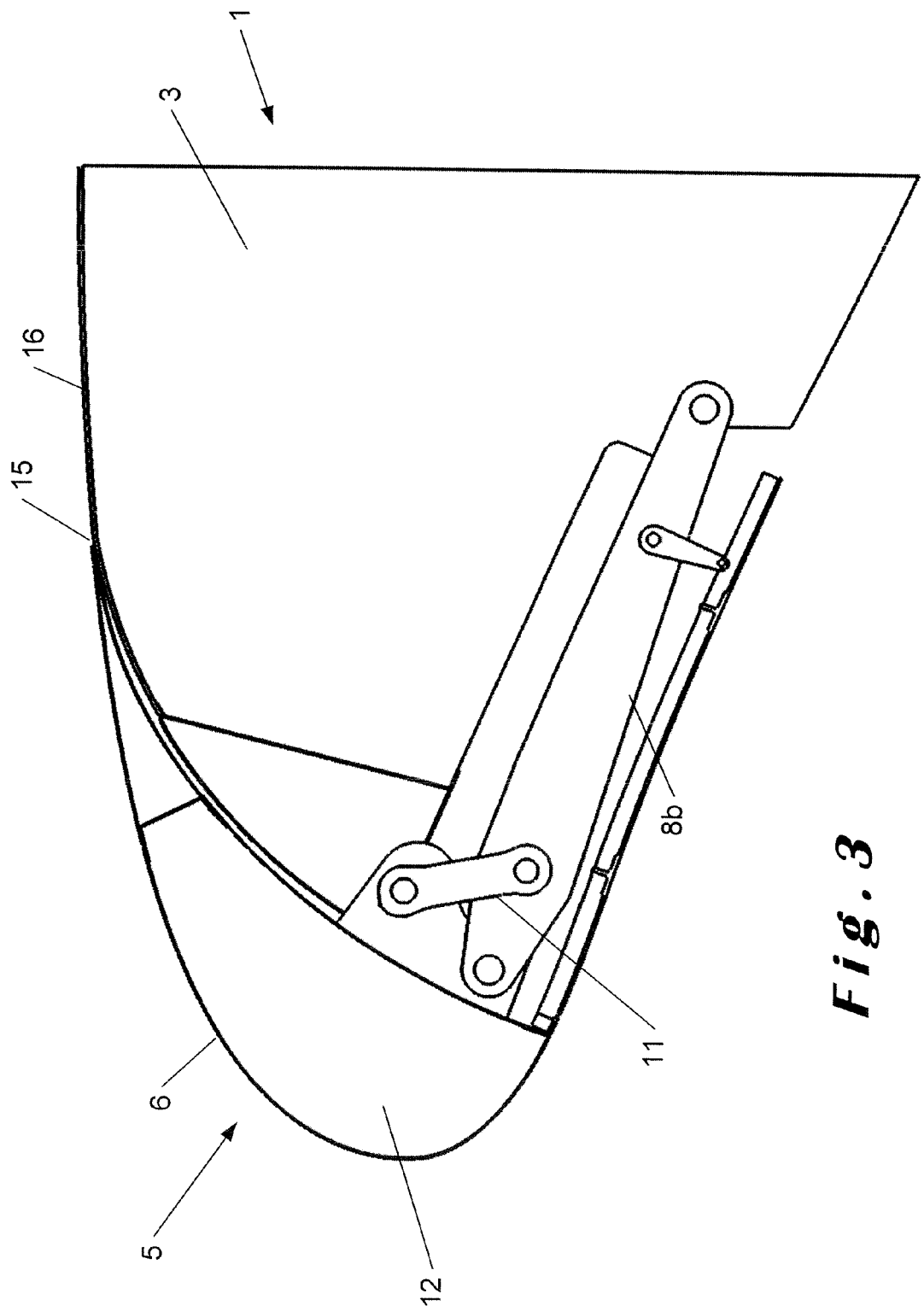
FIG. 3 is a detail view of a droop nose device of FIG. I with an undriven support arm.
Figure 4:
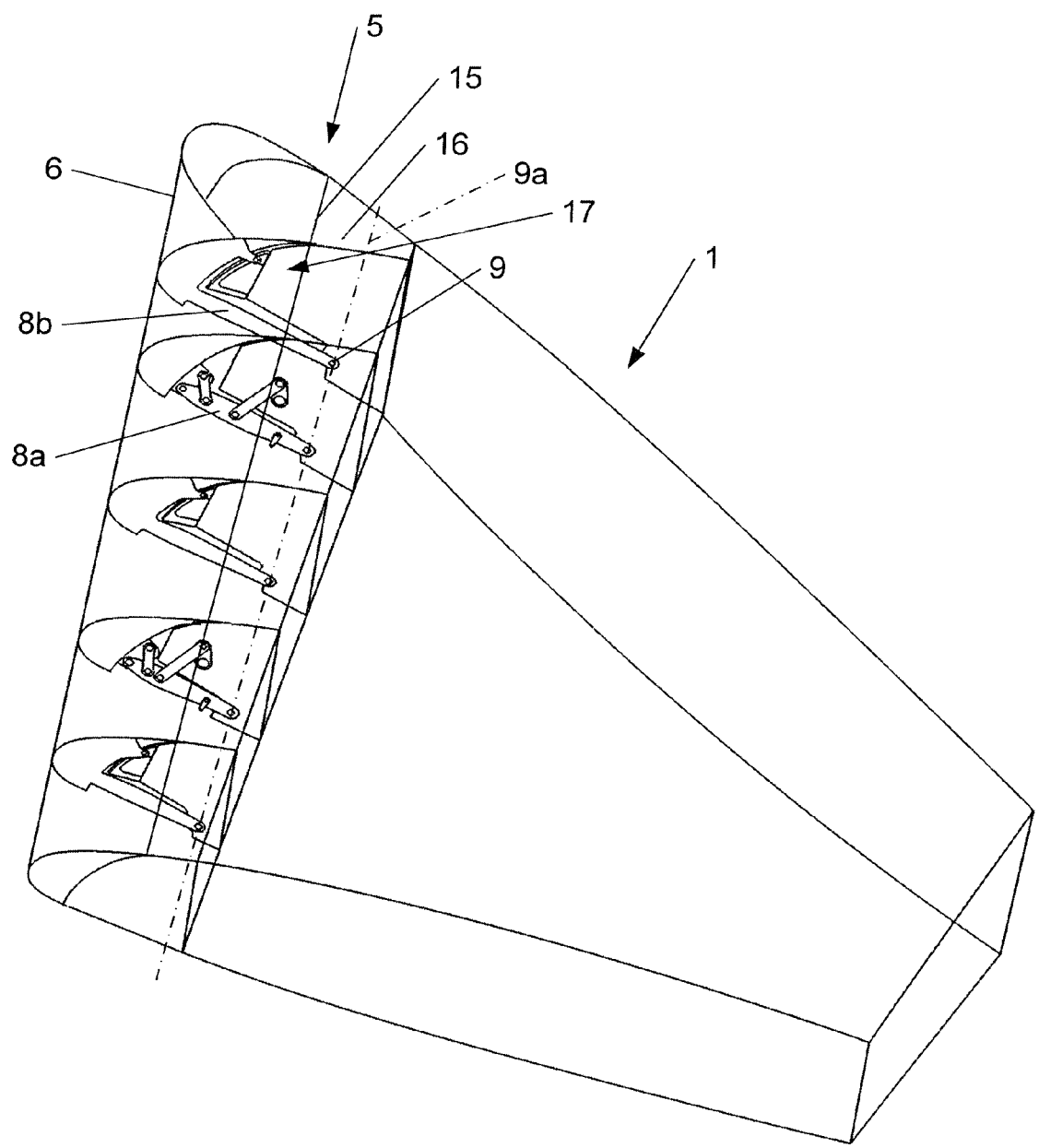
FIG. 4 is a perspective view of a first embodiment of the invention.

FIG. 4 illustrates a wing 1 with a structure comprising several ribs, each including a rib nose 3 protruding beyond a front spar of the wing 1, and a wing leading edge device 5 according to a first embodiment of the invention. This wing leading edge device 5 is a droop nose comprising a moveable body, in the form of a droop nose body 6, and a support and actuation mechanism comprising a plurality of arms 8a,8b, including actuation arms 8a and undriven support arms 8b. Each one of the arms 8a, 8b is linked to a lower part of a rib nose 3 through a hinge 9 at one end of the arm 8a,8b. At the other end of each arm 8a,8b, a three-point attachment 10 comprising three connection points 10a,10b and 10c and a linkage 11 connects the arm 8a, 8b to a droop nose rib 12. Each one of the actuation arms 8a is linked to a rotational actuator through a link 13 and a lever 14, so that each actuation arm 8a can be driven by this rotational actuator in a pivoting movement around the hinge 9 to deploy and retract the droop nose body 6.

Figure 5:
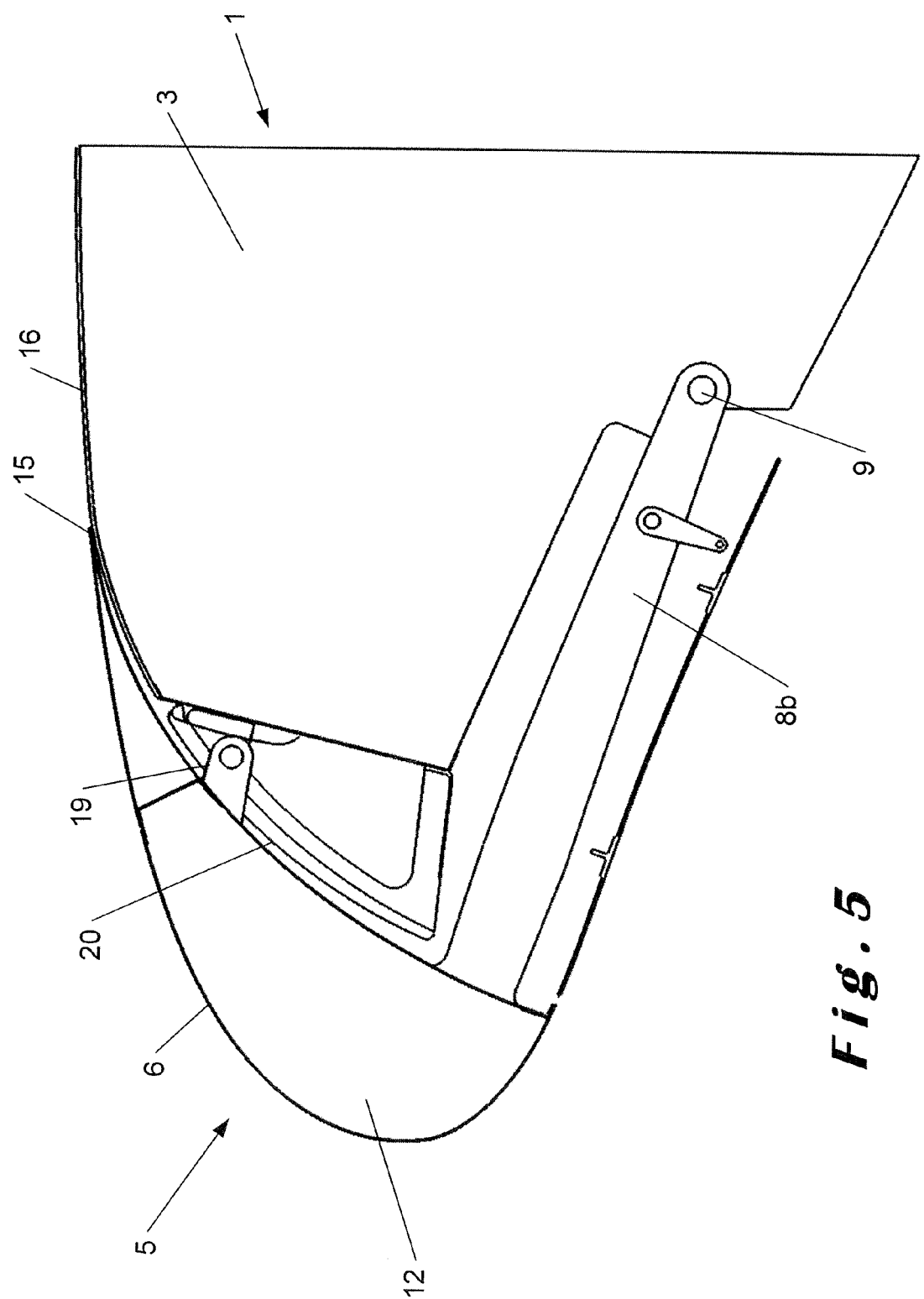
FIG. 5 is a detail view of said first embodiment.
Figure 6:
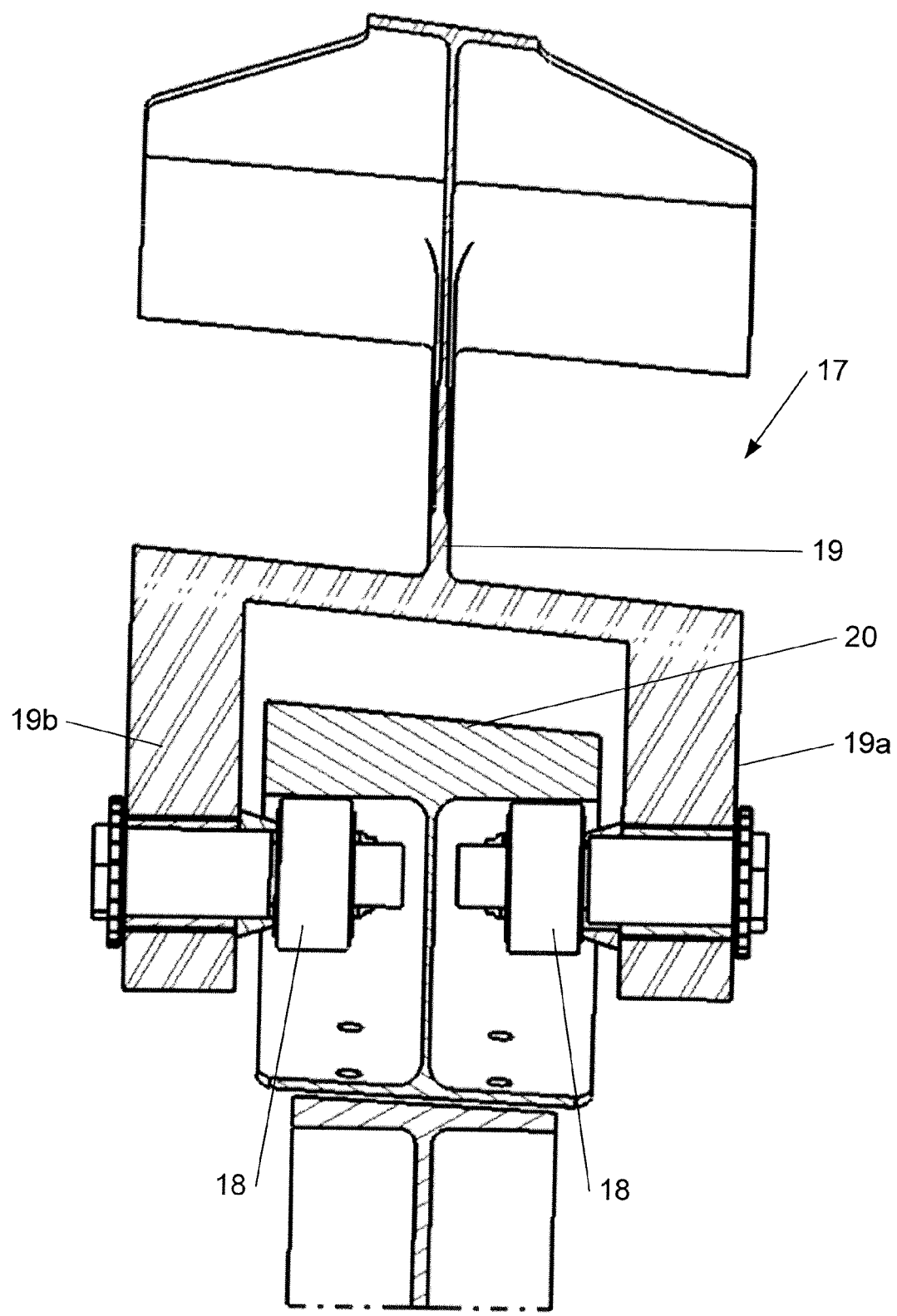
FIG. 6 is a sectional view of the guiding device of this embodiment.

To prevent lift off of the trailing edge 15 of the droop nose body 6 from the surface of the skin 16 of the wing 1, the droop nose 5 also comprises a set of guiding devices 17, associated in this embodiment to the undriven support arms 8b, and each one comprising a follower in the form of a double roller 18 on an arm 19 attached to the droop nose body 6 as close as possible to its trailing edge 15, and a T-track 20, which can be attached to a rib nose 3, as illustrated in FIG. 5, or integrated into it. FIG. 6 shows a section of a guiding device 17, which has two branches 19a, 19b to support the double roller 18. Turning back to FIG. 5, the T-track 20 follows a circular arc substantially centred on the hinge 9, so as to guide the double roller 18 along the deployment arc of the wing leading edge device 5 while reacting any aerodynamic forward pitching moment on the droop nose body 6, retaining its trailing edge 15 close to the surface of the outer skin 16 of the wing 1.

As the arm 19 supporting the double roller 18 is mounted near the trailing edge 15 of the droop nose body 6, the outer skin 16 comprises a cut-out to let it through. When the droop nose body 6 is deployed, this cut-out will be directly exposed to the airflow. To prevent air and foreign objects going through the cut-out, it may be sealed, for example with a spring loaded door seal or a sliding curtain seal.

Figure 7:
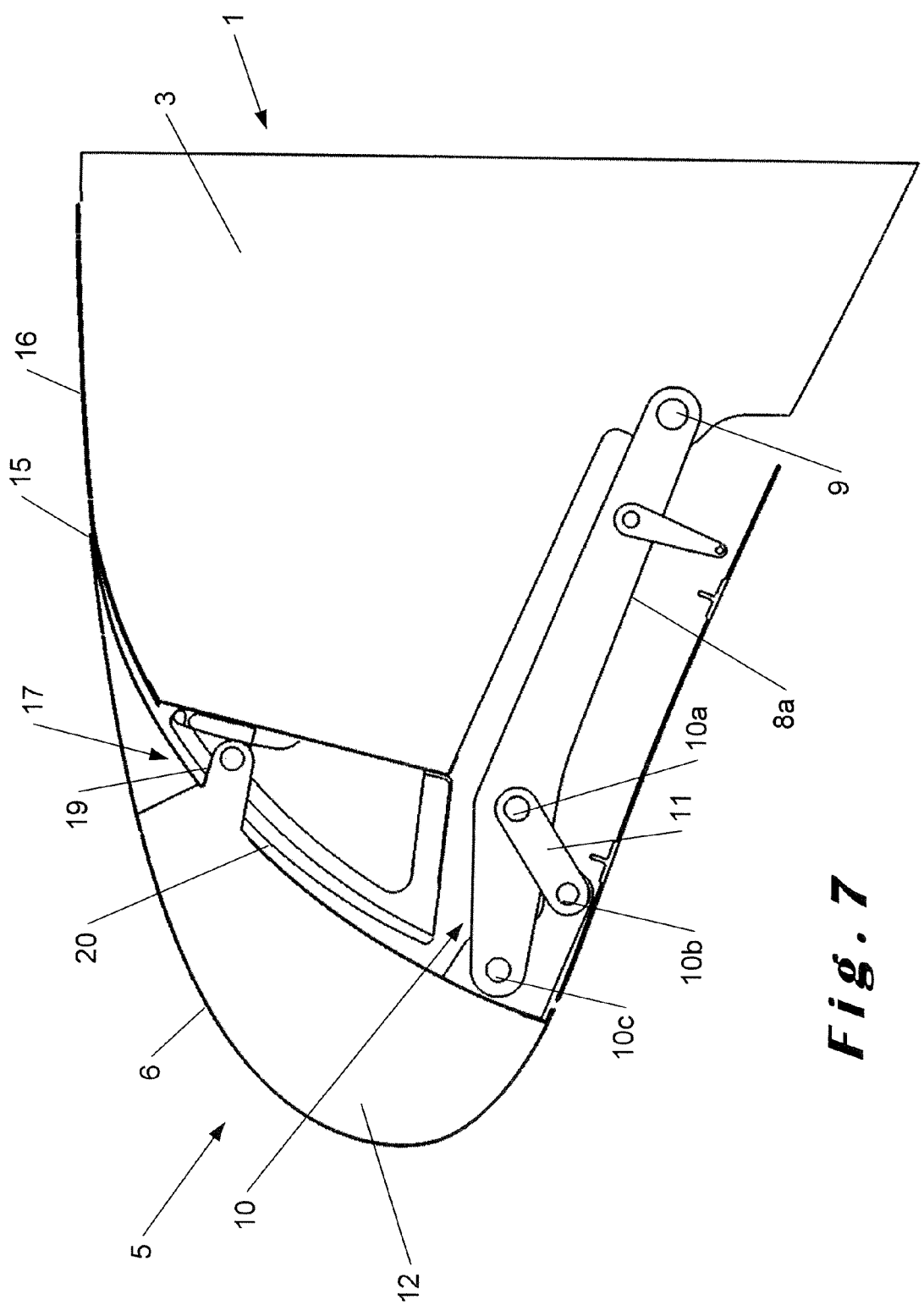
FIGS. 7-10 are detail views of other embodiments with different support mechanisms.
Figure 8:
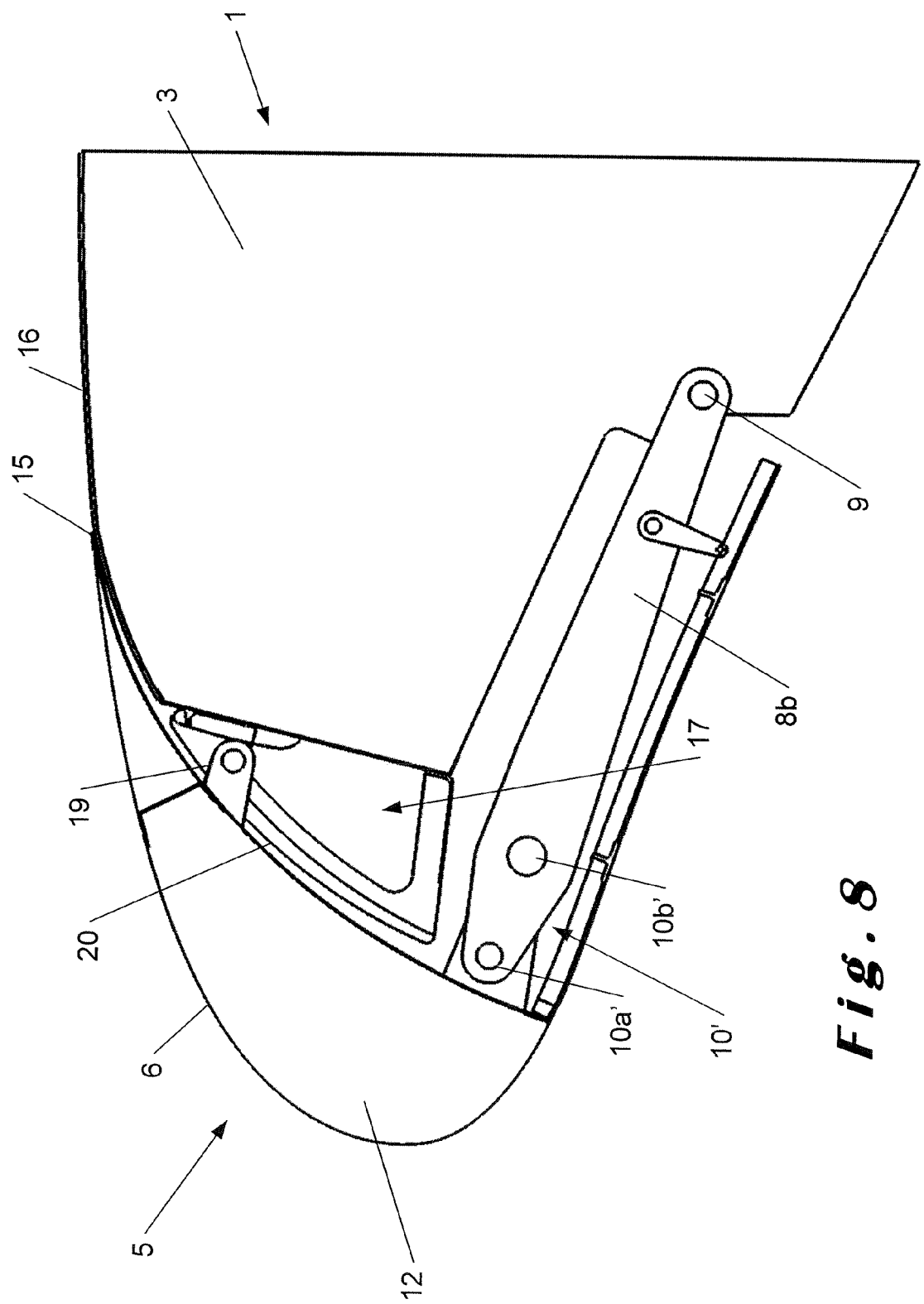
Figure 9:
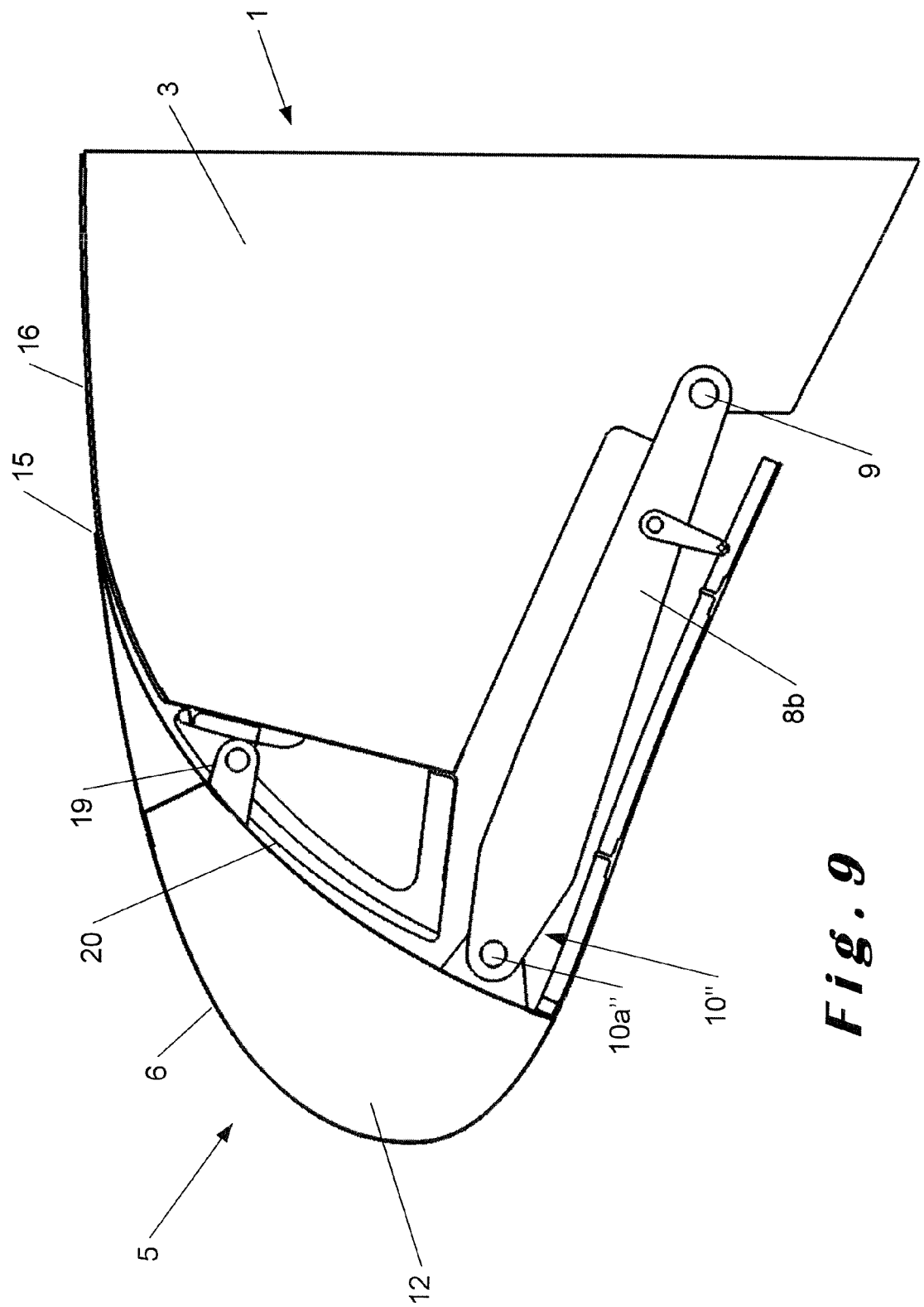

In the embodiment shown in FIGS. 4 and 5, each undriven support arm 8b is formed integrally with a droop nose rib 12, whereas the actuation arms 8a are attached to other droop nose ribs 12 through three point attachments 10. As the set of guiding devices 17 would react the aerodynamic forward pitching moments on the droop nose body 6, alternative embodiments are also possible, where these rigid attachments can be replaced on at least some of the arms 8a, 8b by different arrangements. FIG. 7 shows one such alternative embodiment in which an undriven arm 8b is also linked to a droop nose rib 12 through a three point attachment 10 comprising three attachment points 10a, 10b, 10c and a linkage 11. FIG. 8 shows another alternative embodiment in which an undriven arm 8b is linked to a droop nose rib 12 through a simpler attachment 10' comprising two eccentrically adjustable pins 10a', 10b'. FIG. 9 shows another alternative embodiment wherein an undriven arm 8b is linked to a droop nose rib 12 through an even simpler single point attachment 10" comprising a single attachment point 10a", preferably with a spherical bearing 10a".

Figure 10:
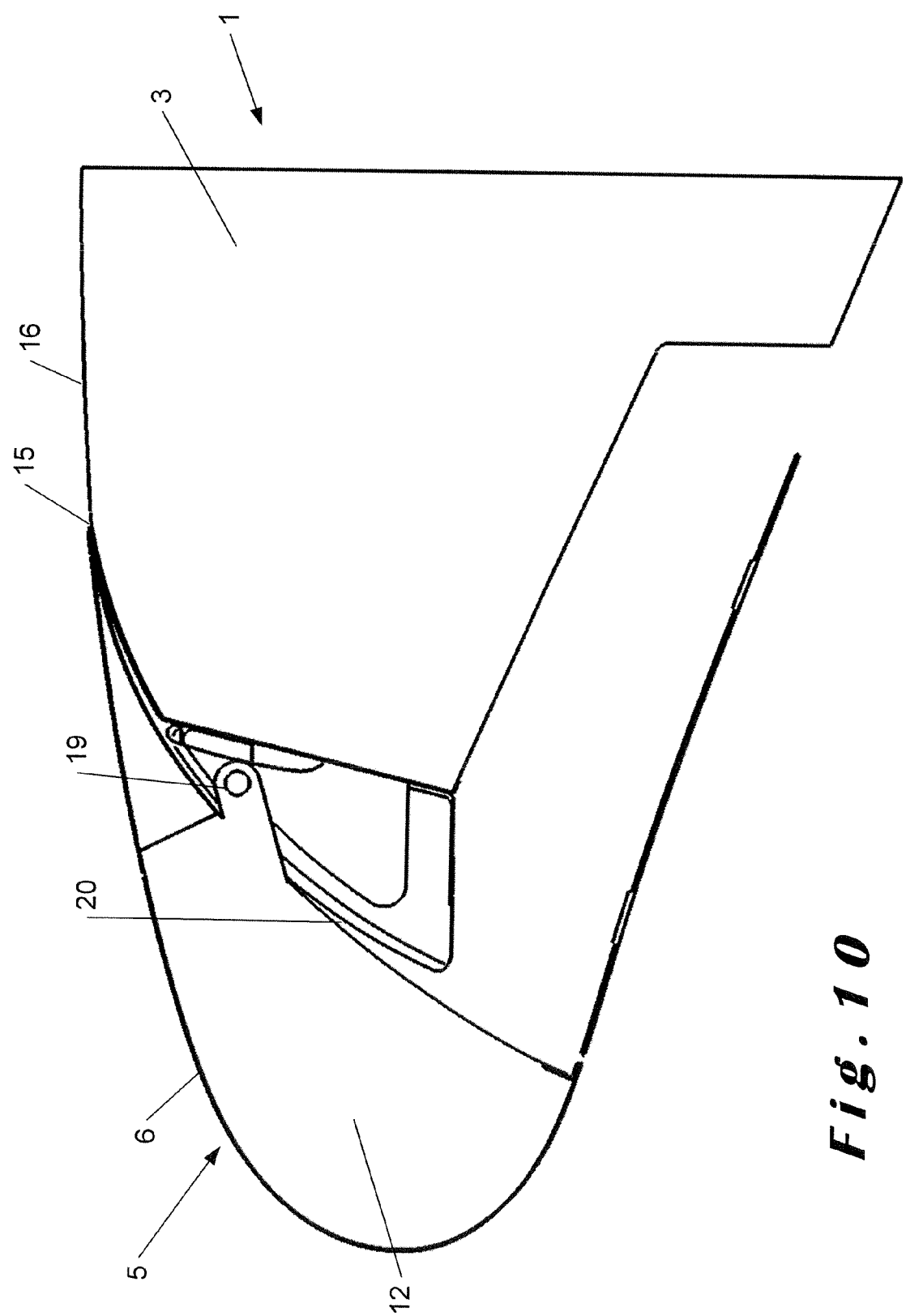

This set of guiding devices 17 could be associated to each one of the arms 8a, 8b, or only to one or some of them. For instance, they could be associated only to some of the undriven arms 8b. Also, as illustrated in FIG. 10, a guidance device 17 does not need to be in substantially the same plane as one of the support arms 8a,8b, and instead can be, as illustrated, attached to a rib nose 3 to which no support arm 8a,8b is attached, as long as the track 20 follows a circular arc centred around the hinge line 9a of the support and actuation mechanism.

Figure 11:
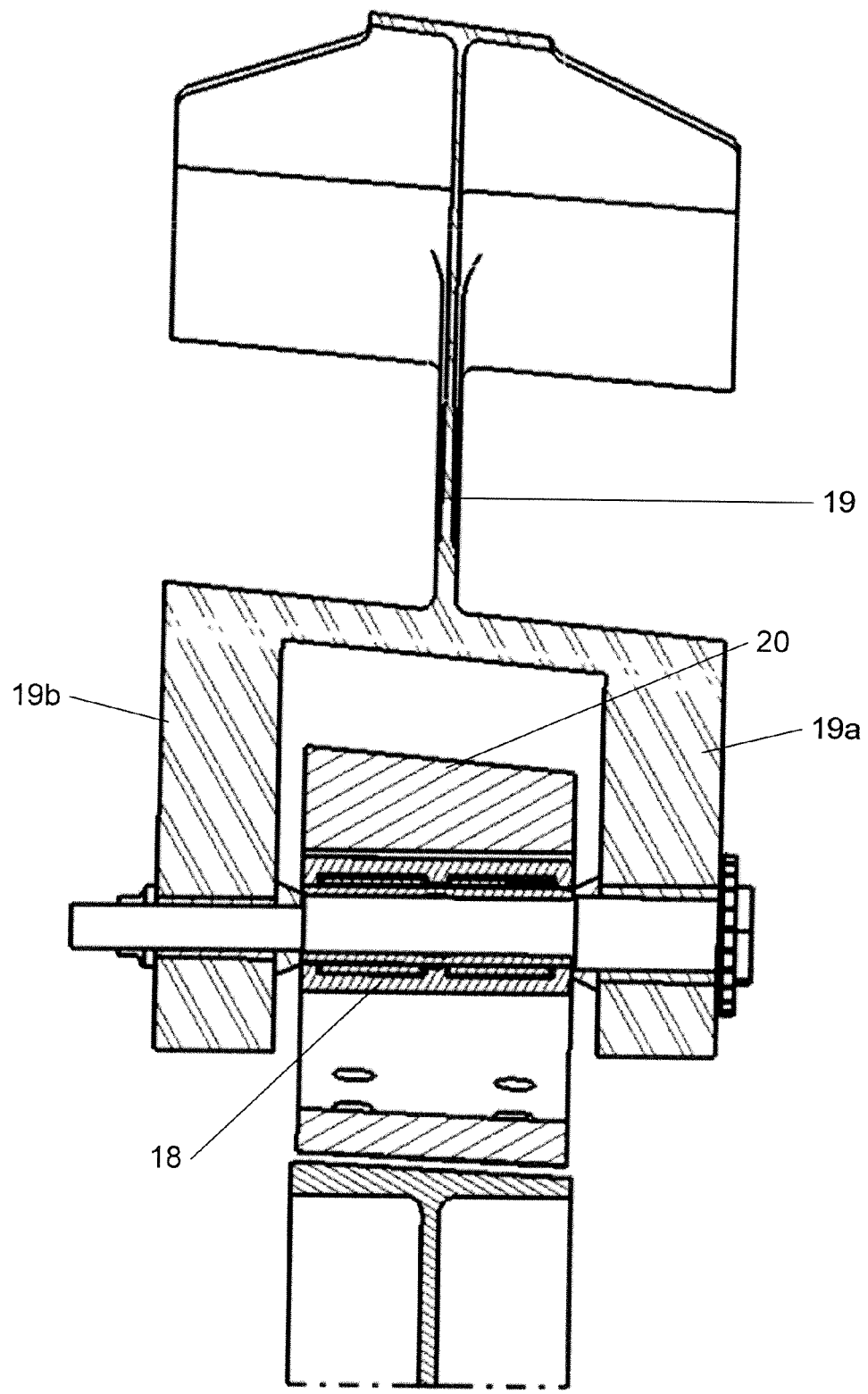
FIG. 11 is a sectional view of a guiding device of another embodiment.
Figure 12:
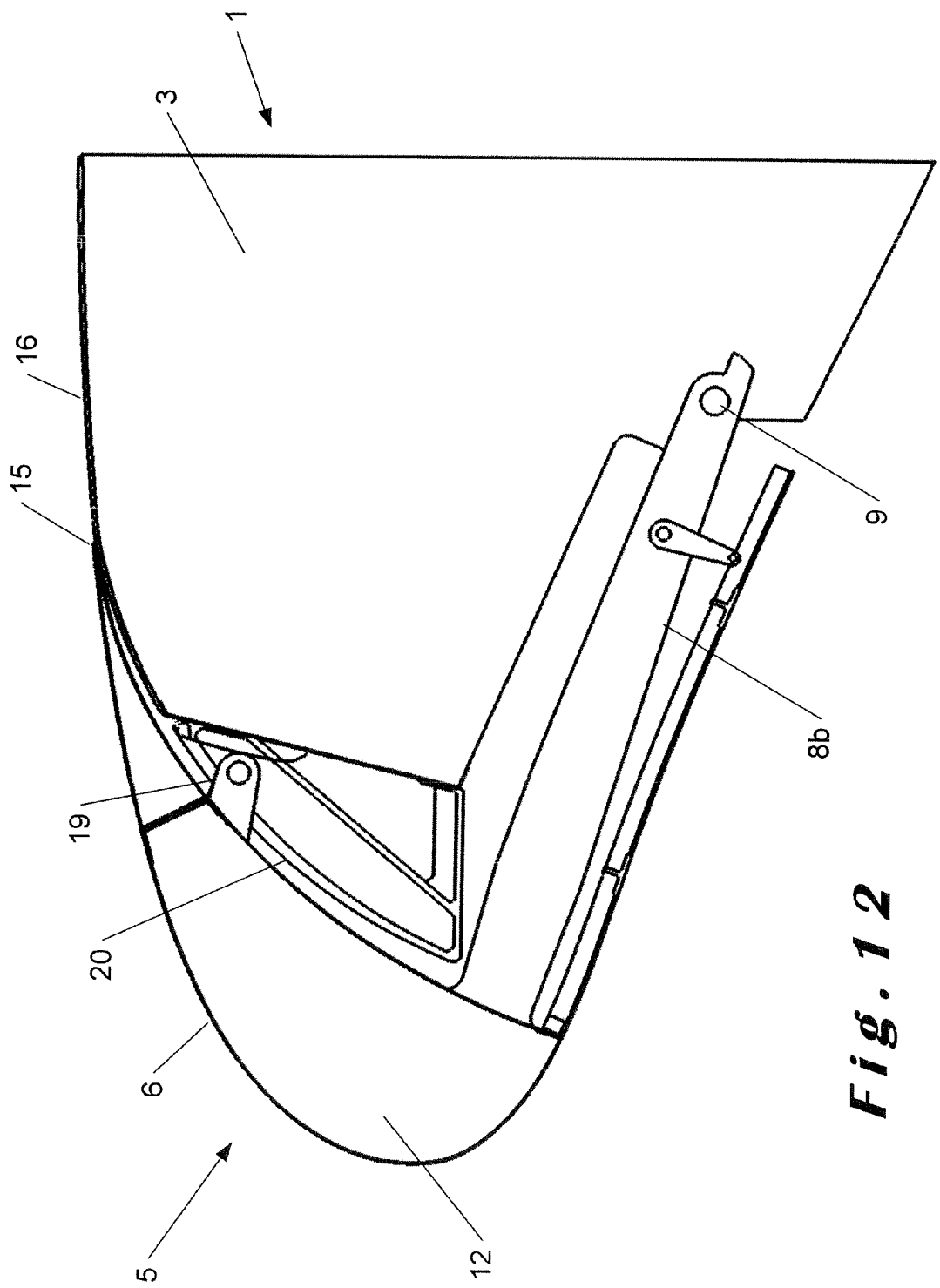
FIGS. 12-16 are detail views of other embodiments with various support mechanisms but the same guiding device of FIG. 11.
Figure 13:
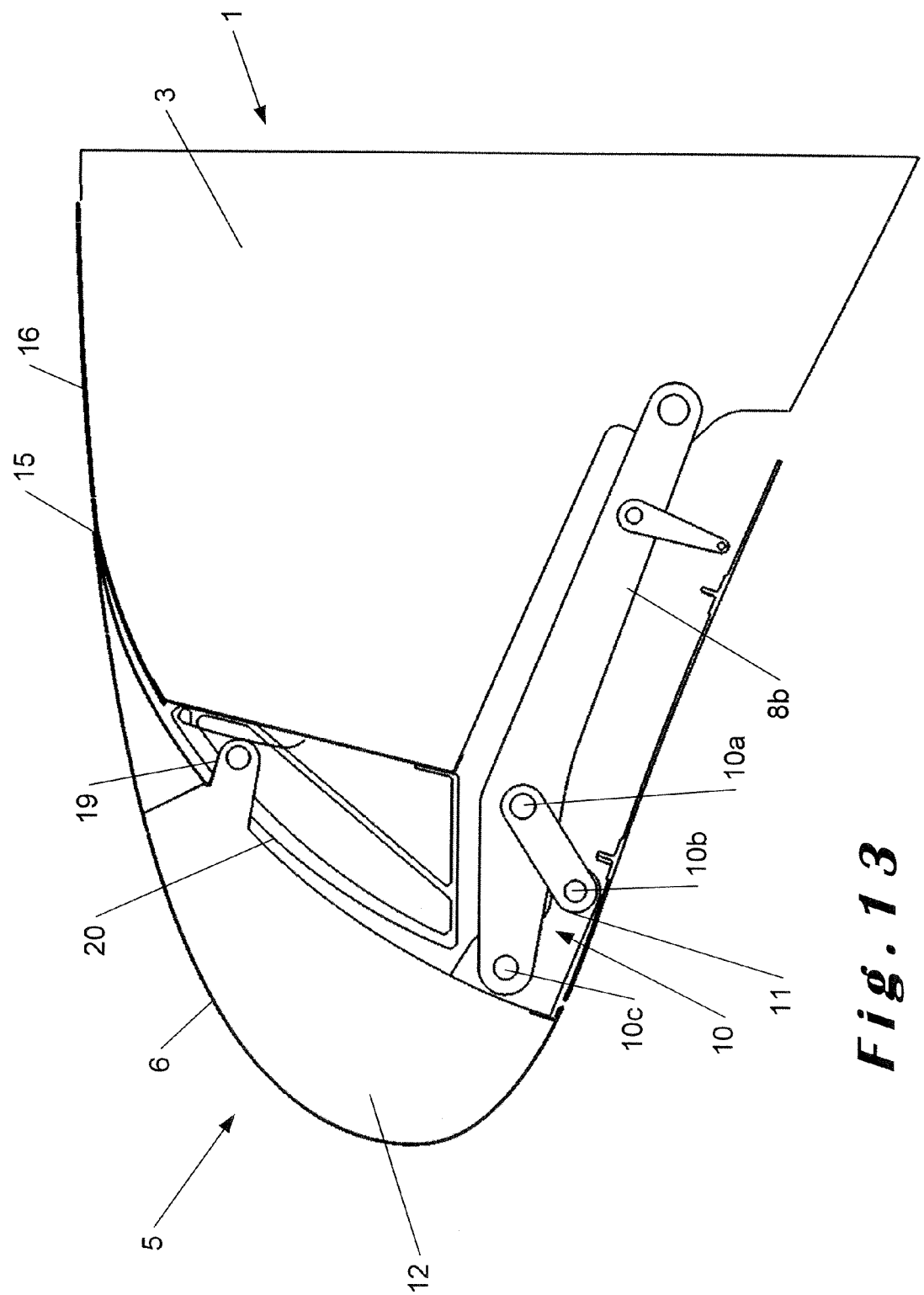
Figure 14:
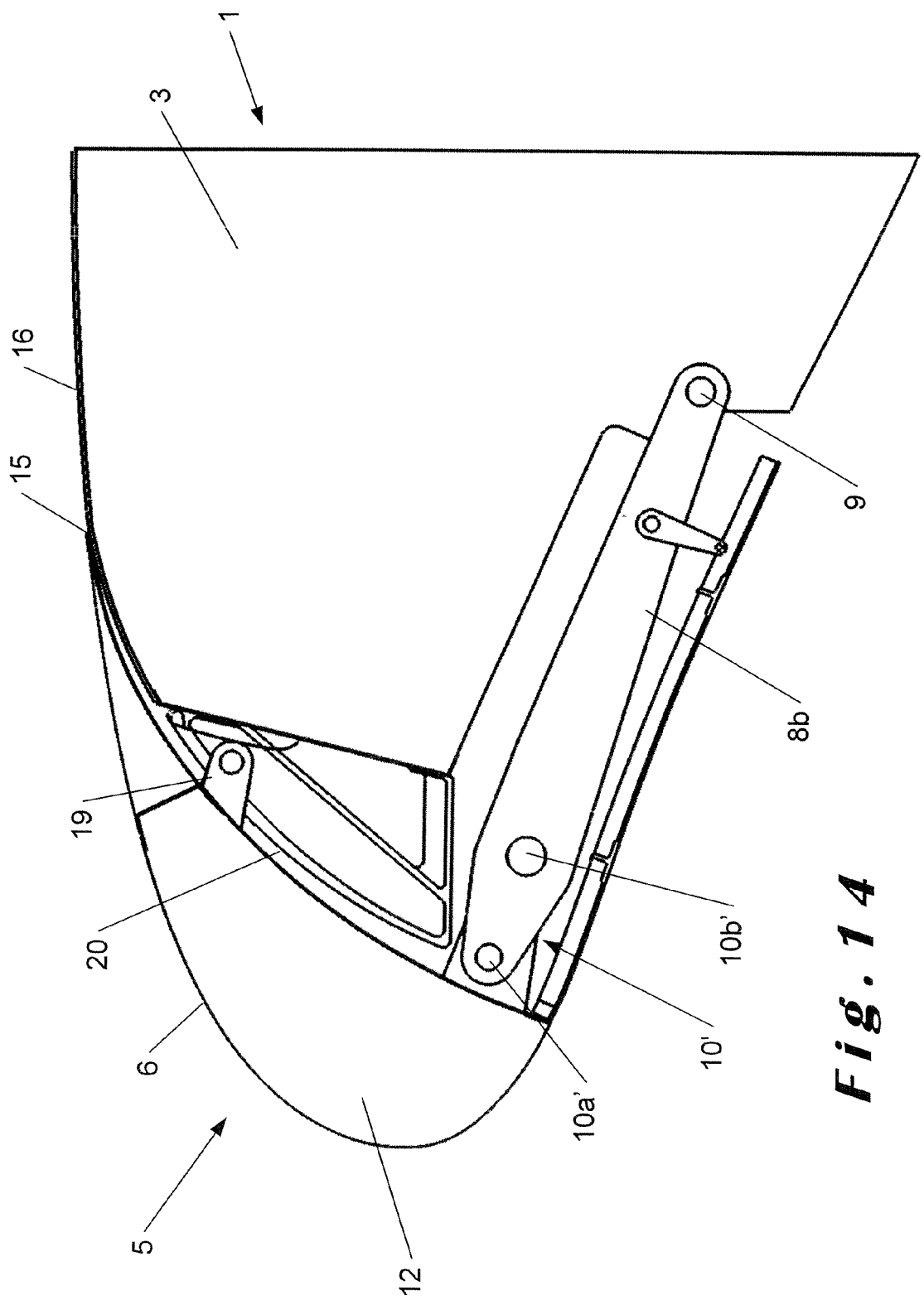
Figure 15:
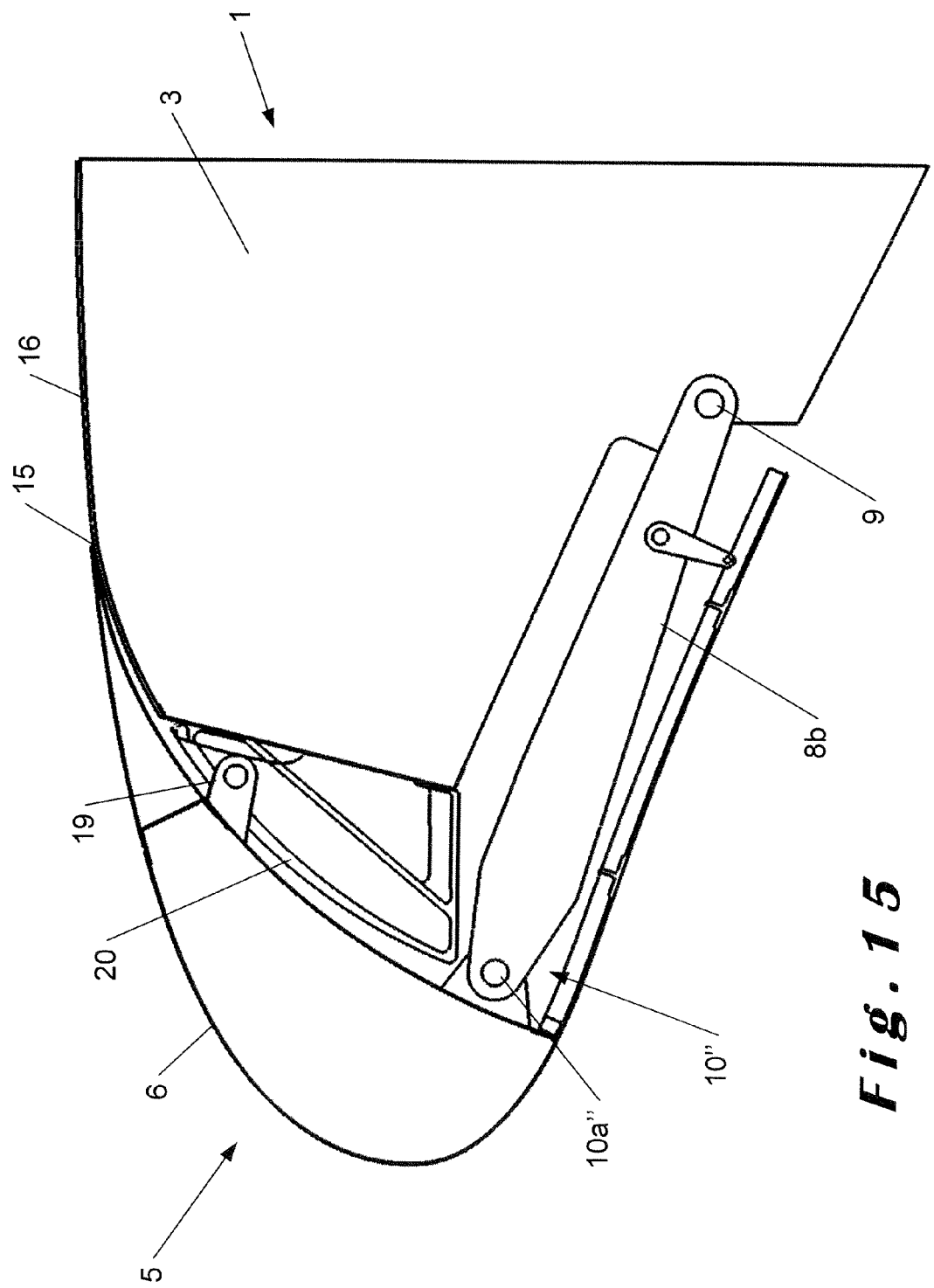
Figure 16:
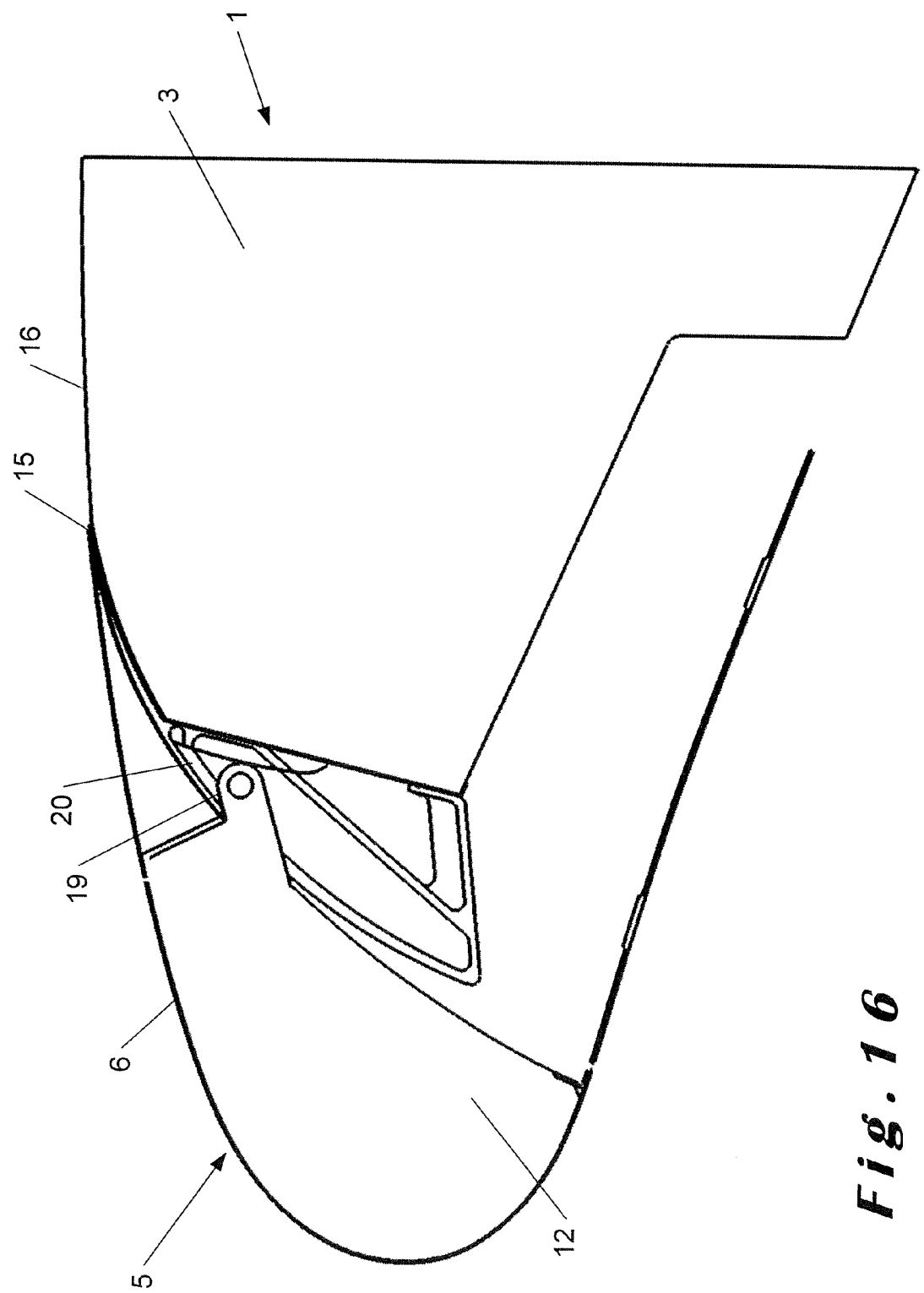
Figure 17:
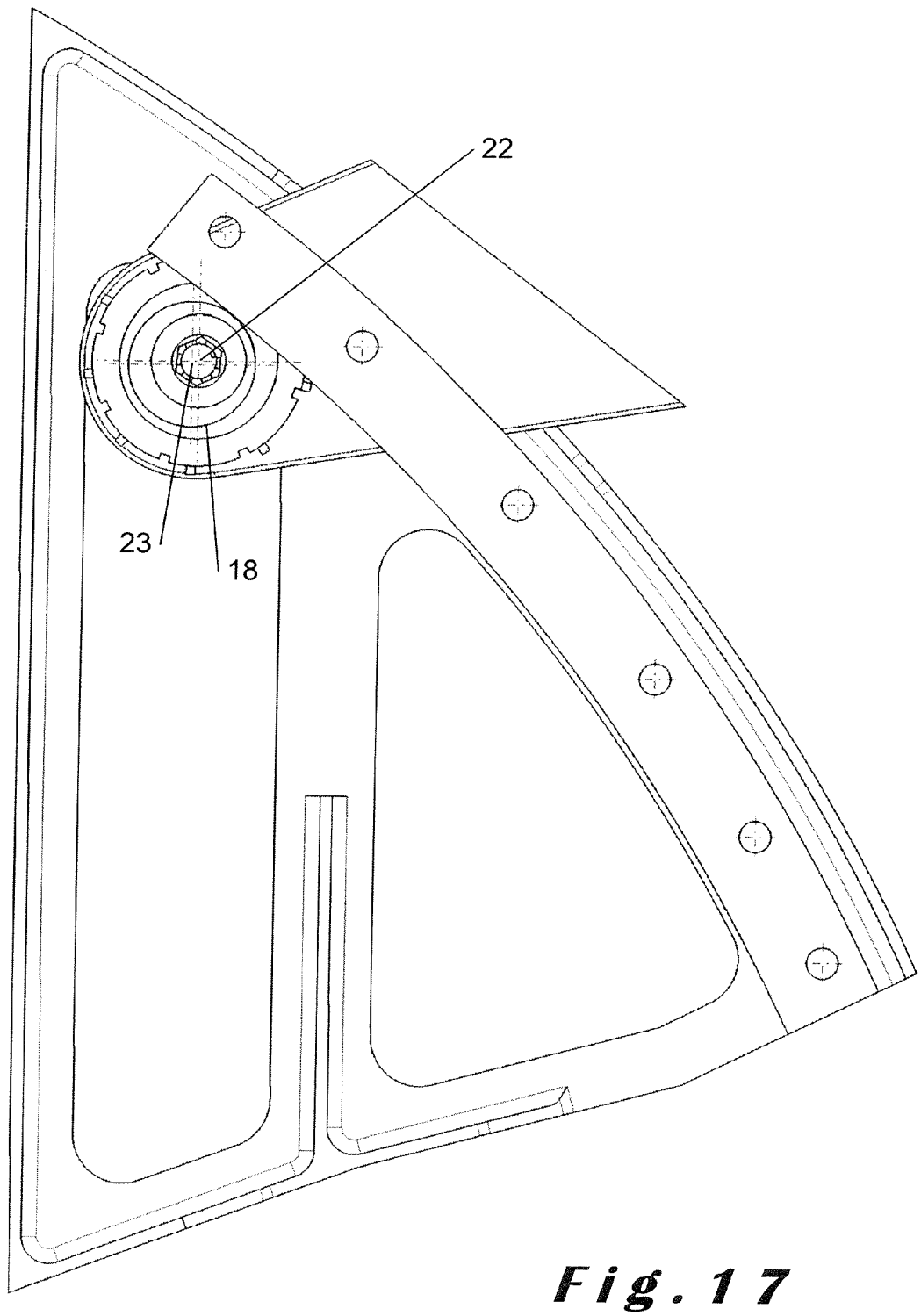
FIGS. 17, 18, 18a and 18b are detail views of the guiding device of another embodiment.
Figure 18:
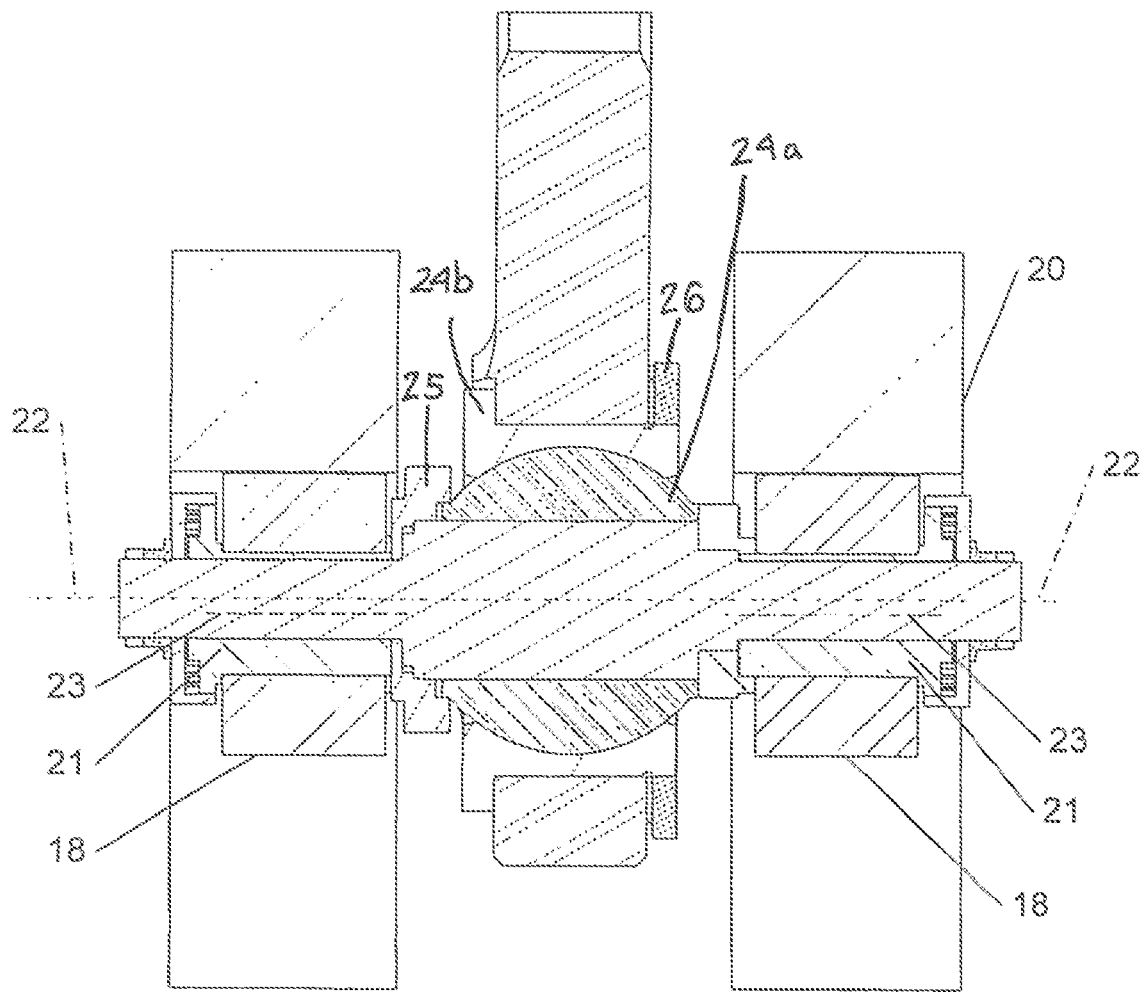
Figure 18A:
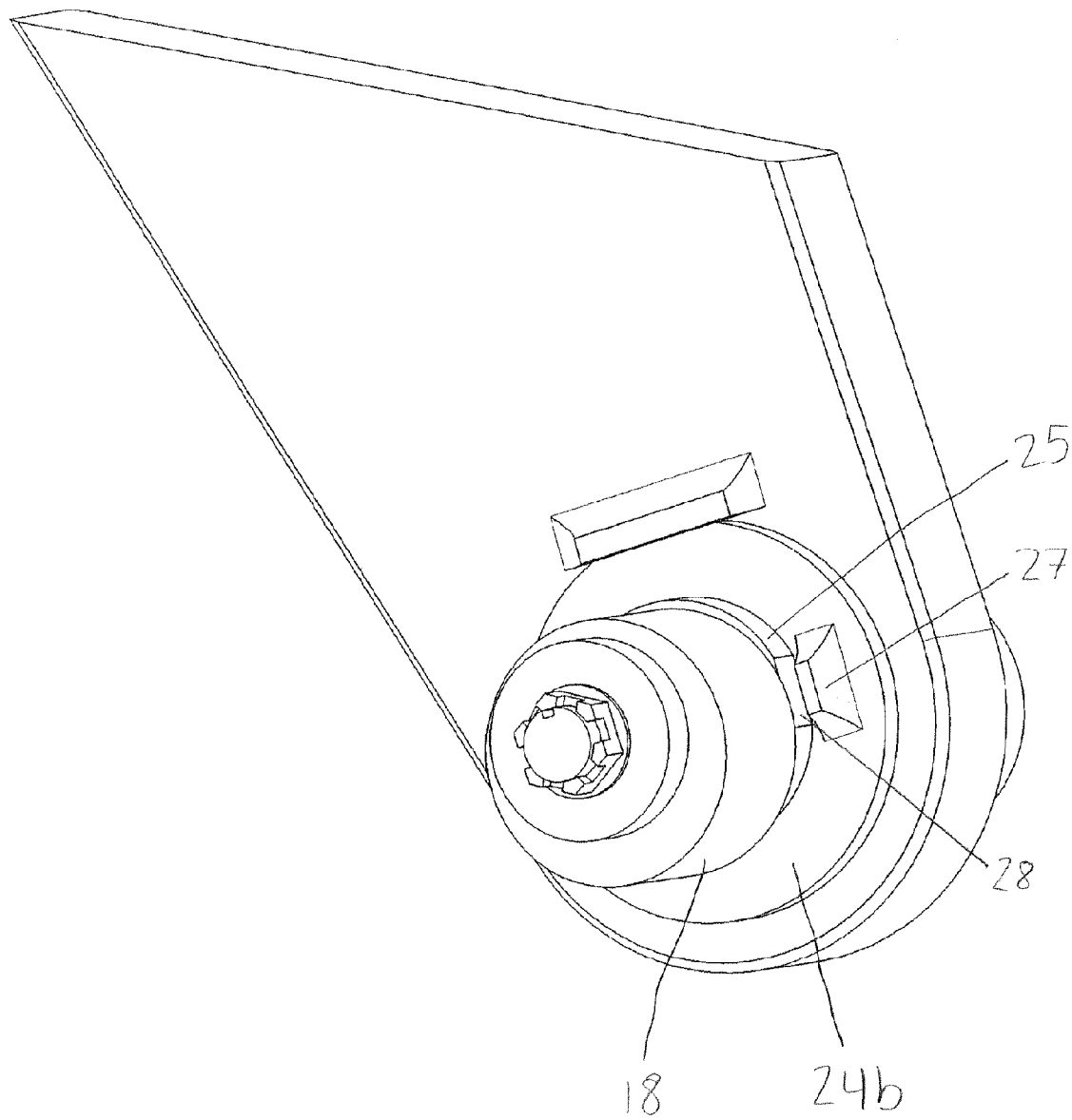
Figure 18B:
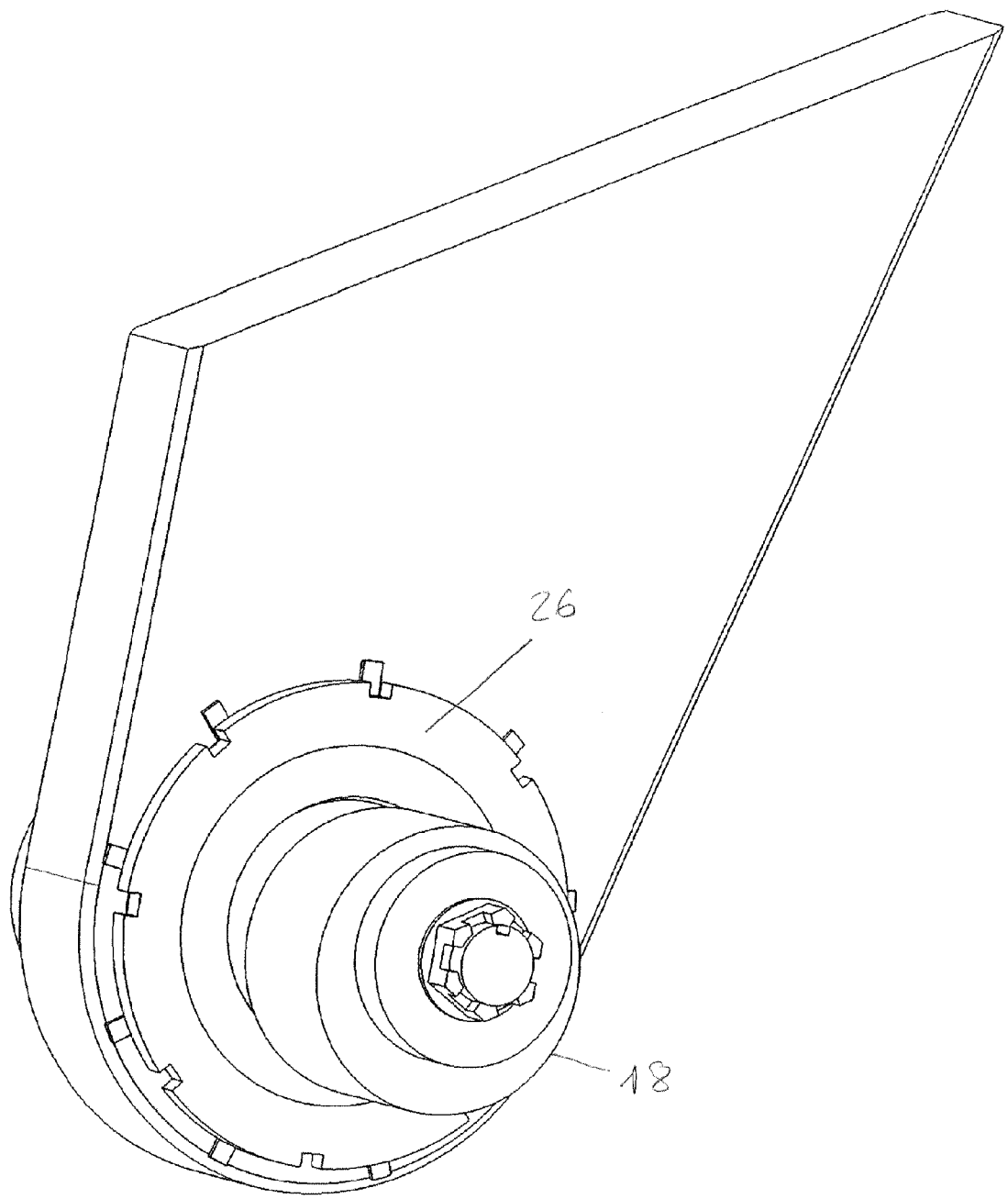
Figure 19:
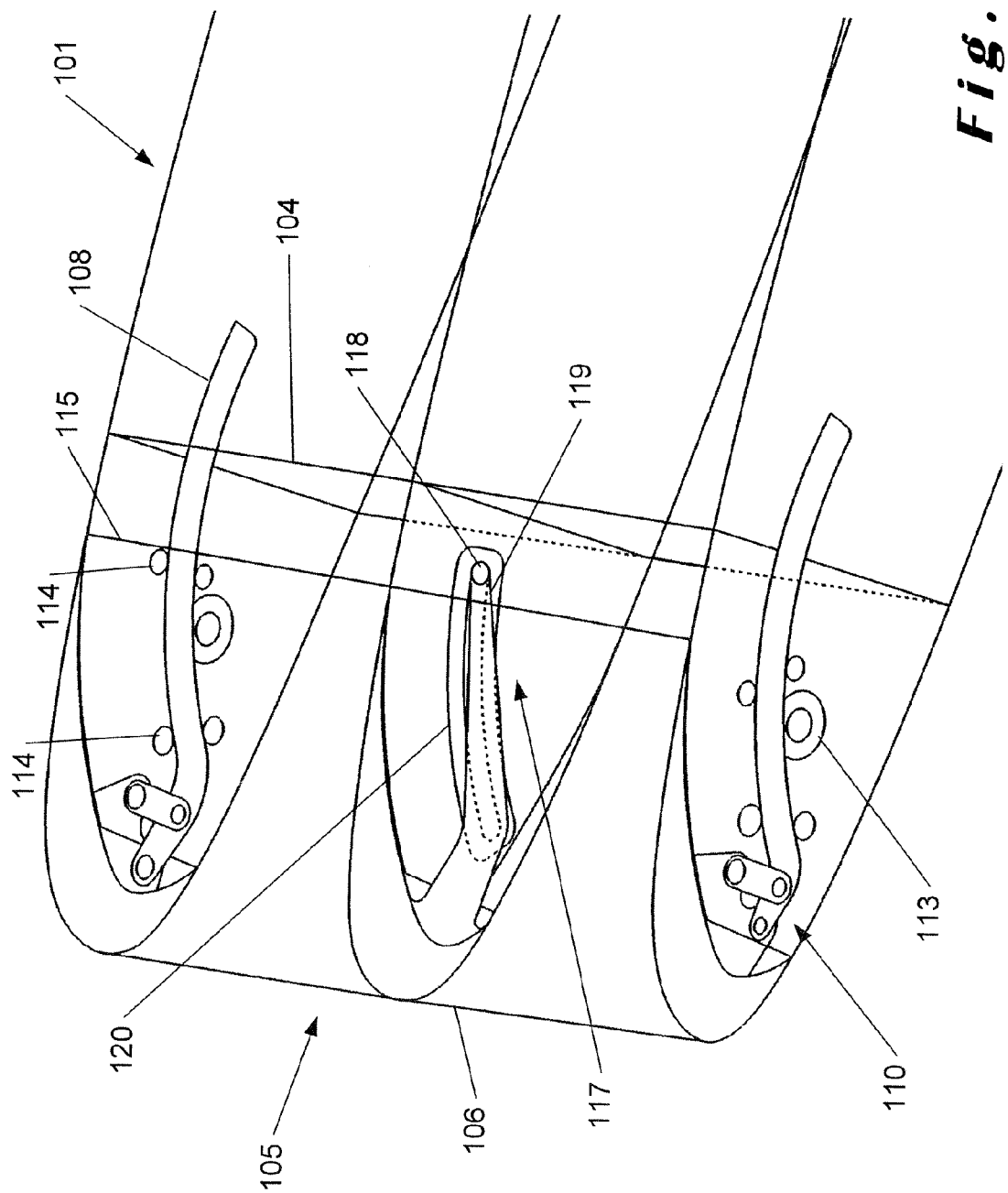
FIGS. 19 and 20 are perspective views of another embodiment where the wing leading edge device is a sealed slat device, in retracted and deployed positions.
Figure 20:
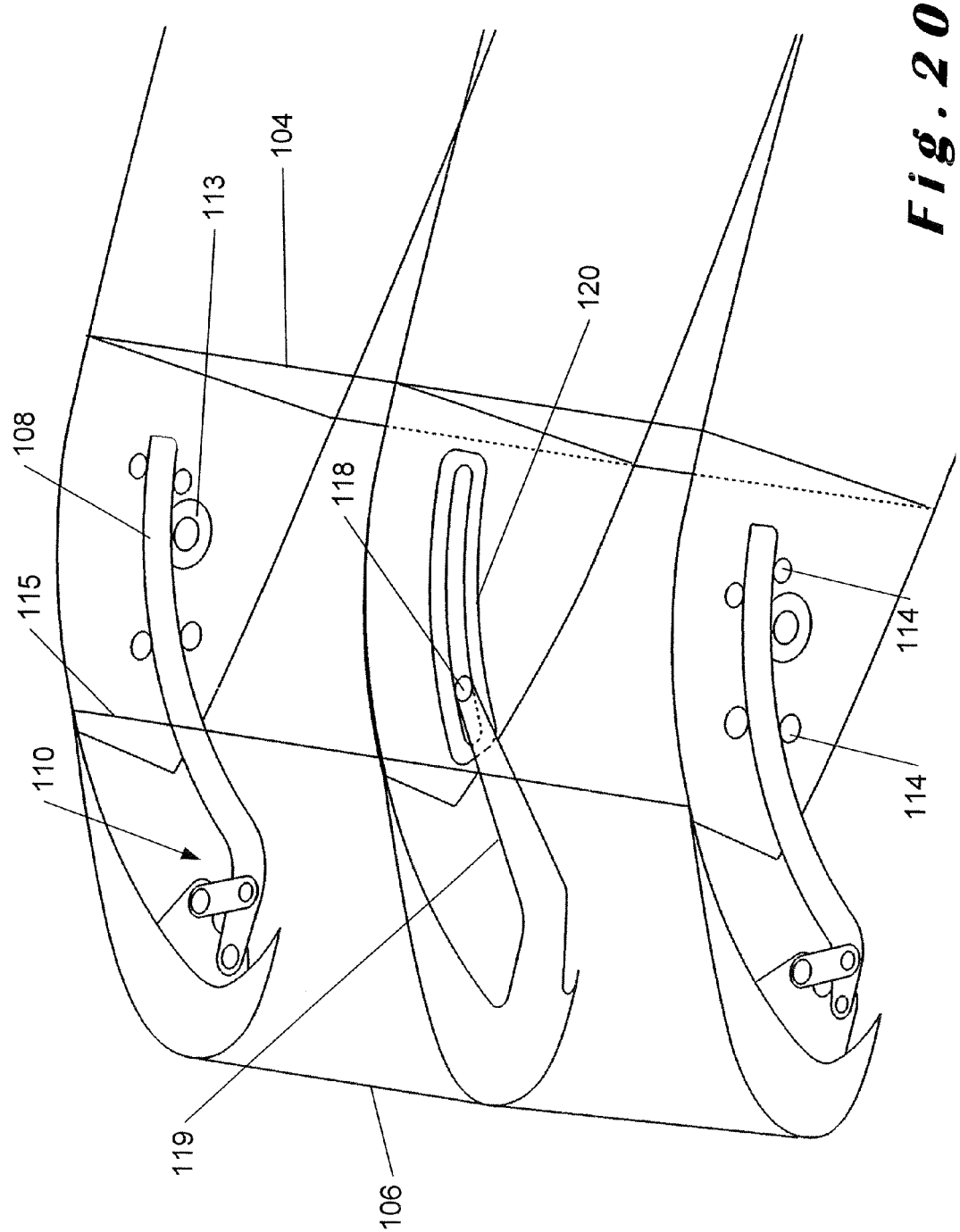
Figure 21:
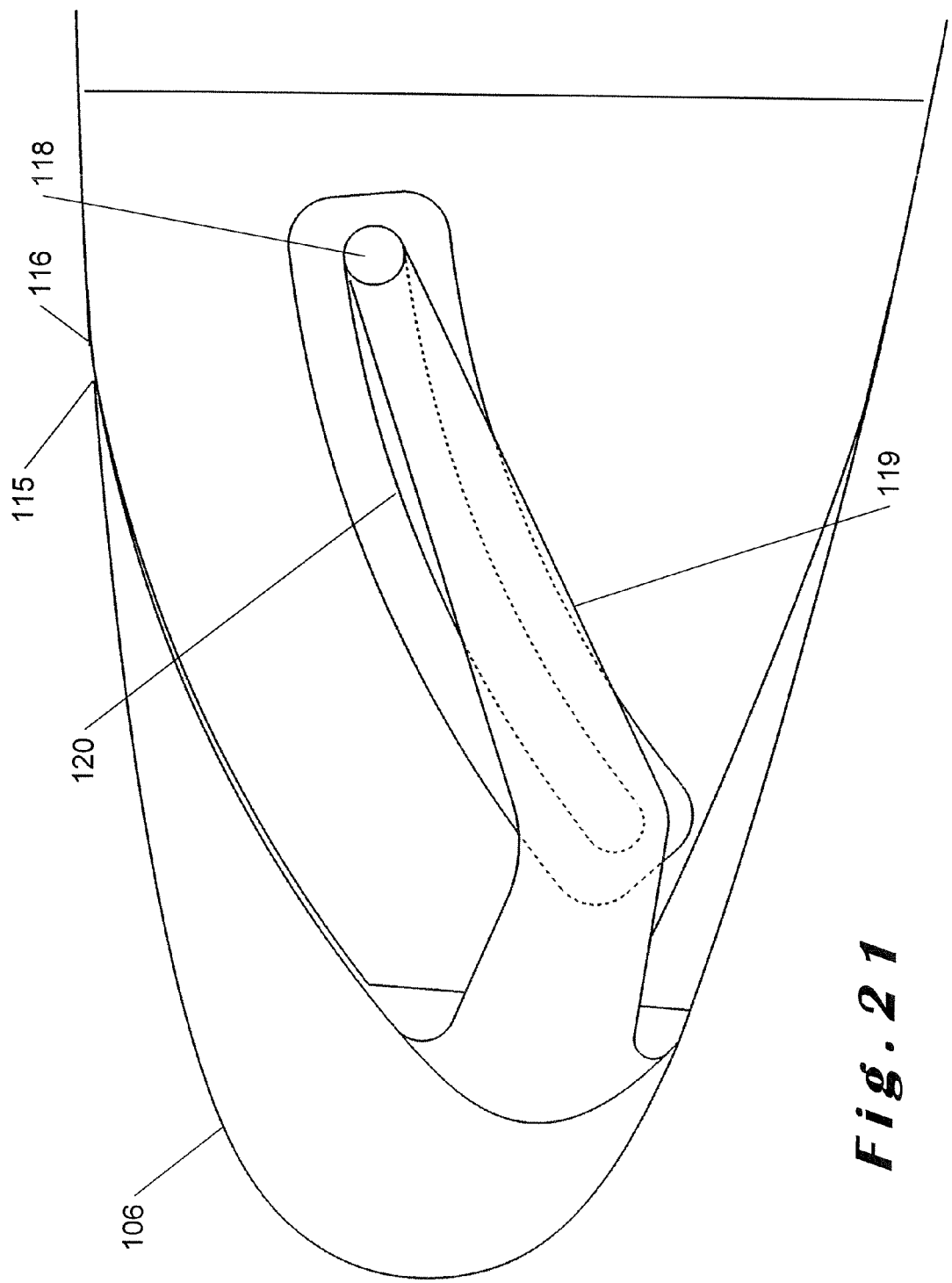
FIGS. 21 and 22 are detail views of the guiding device of the same sealed slat device in retracted and deployed positions.
Figure 22:
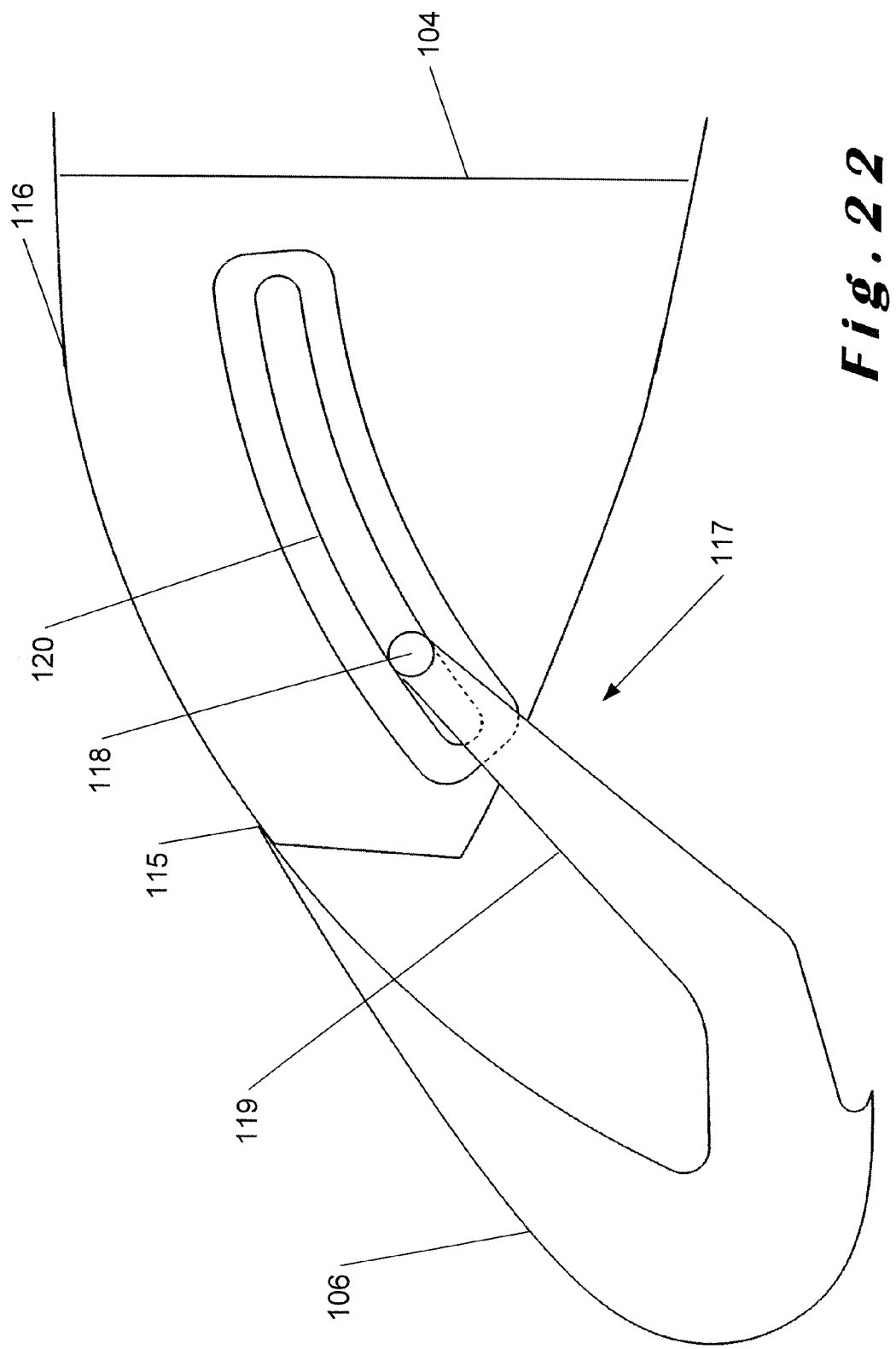
Figure 23:
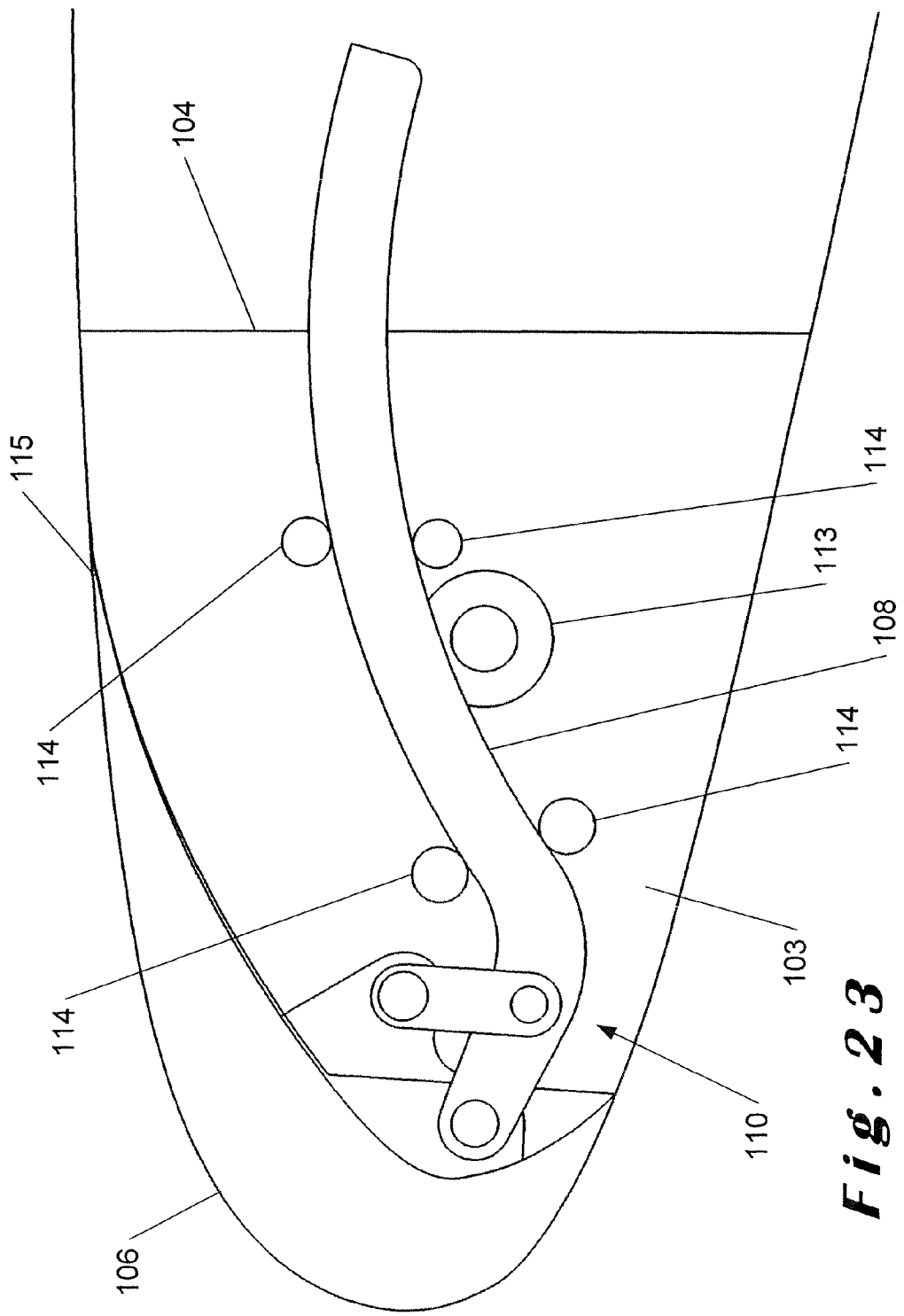
FIGS. 23 and 24 are detail views of a support track of the same sealed slat device in retracted and deployed positions.
Figure 24:
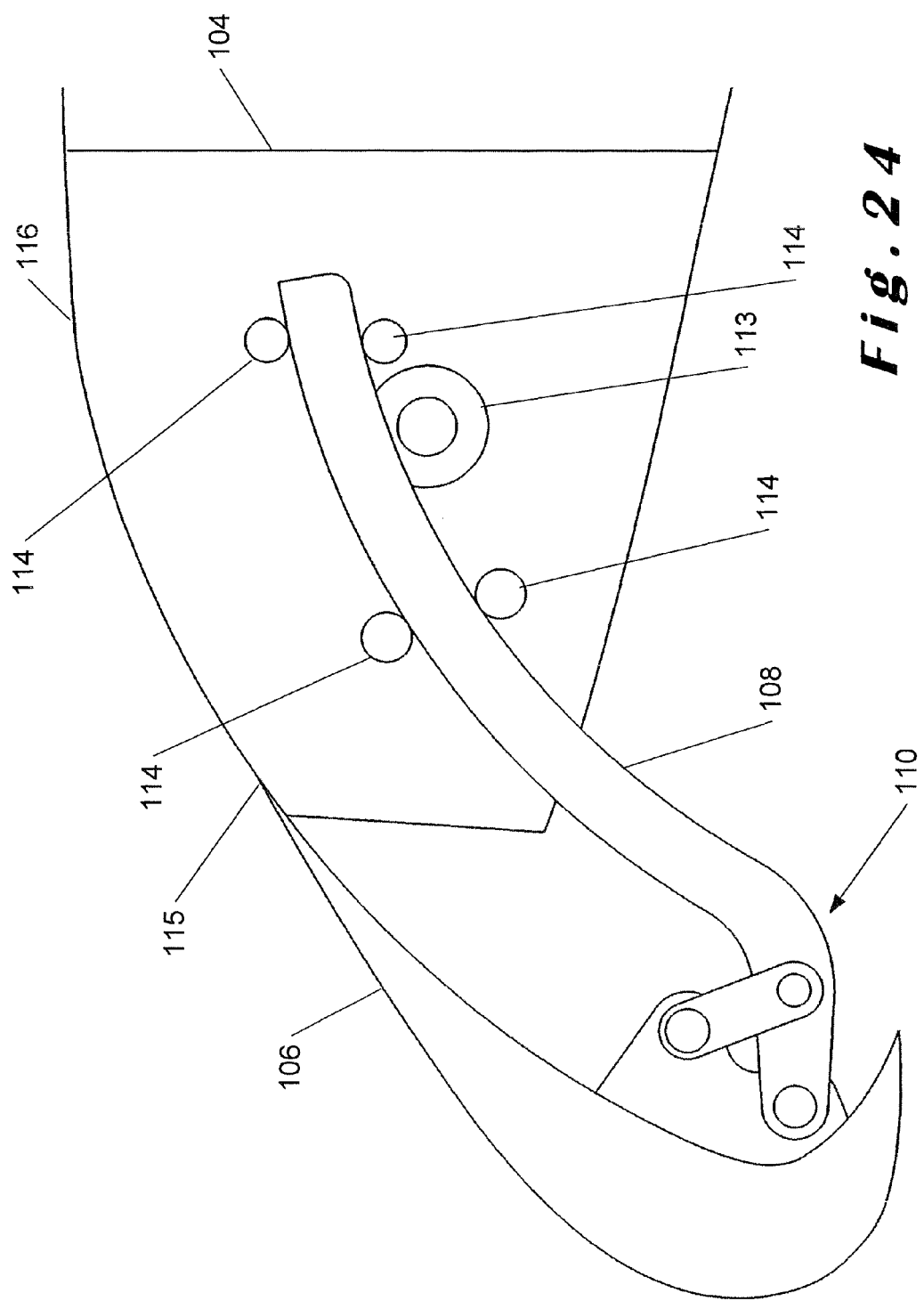

In alternative embodiments, illustrated in FIGS. 11-16, the guiding device 17 may comprise a single roller instead of the double roller 18 of the previous embodiment. To guide this single roller, the track 20 may be a slotted track, as illustrated in FIG. 11, instead of the T-track of the previous embodiments. Like the T-track of FIGS. 4-10, it would follow a substantially circular arc substantially centred on the hinge line 9a.

In another embodiment, partially illustrated in FIGS. 17, 18, 18a and 18b, the double roller 18 may comprise eccentric bushings 21, which, by rotation around an adjustment axis 22, allow an adjustment of the position of the rotation axis 23 of the double roller 18 in order to compensate for any play in the guiding device 17 and provide a reliable rolling contact between the roller 18 and the track 20. Such an eccentric bushing could also be used for the same purpose in an alternative embodiment with a single roller, similar to those of FIGS. 11-16.

To compensate for angular misalignments, and preferably, but not necessarily, as complement to said eccentric bushings 21, the rotation axis 23 of the roller 18 may also be pivotable around a substantially perpendicular axis. In particular, as illustrated in FIGS. 17, 18, 18a and 18b, the roller 18 may be supported by a spherical bearing comprising an inner member 24a and an outer member 24b. The pivoting movement of the roller rotation axis 18 may be restricted to a single degree of freedom, for instance using stops 27 in said outer member 24b abutting against complementary surfaces 28 in a ring 25 fixed on said inner member 24a. The angular position of those stops may be adjusted using an adjustment ring 26 to lock the outer member 24b in position, so as to determine the direction of the single pivoting axis of the roller rotation axis.

Yet another different embodiment is illustrated in FIGS. 19 to 24. The wing leading edge device 105 of this embodiment comprises a moveable body, in the form of a sealed slat body 106, and a support and actuation mechanism comprising a plurality of support tracks 108. Each of said support tracks 108 is formed by an elongated member forming a substantially circular arc, supported by rollers 114 and comprising a rack arranged to engage a pinion 113 coupled to at least one rotational actuator, and substantially rigidly attached to the sealed slat body 106 with a three-point attachment 110. The substantially circular arcs of all support tracks 108 are substantially centred on points along a virtual hinge line (not illustrated) below the wing 101. To respectively deploy or retract the sealed slat 106, the support tracks 108 are driven out or in by said pinions 113, so that the sealed slat follows a substantially circular motion around said virtual hinge line. Alternatively, a linear actuator, such as a jackscrew, pivotally attached to both the sealed slat body 106 and to the wing structure, could drive said motion. To accommodate the support tracks 108 in their rearward position when the sealed slat is retracted, cut-outs are generally required in the front spar 104 of the wing 101. Such cut-outs being structurally undesirable, it is therefore preferred to minimise the number of support tracks 108. Since, however, too large a space between support tracks 108 would eventually allow some lift-off of the sealed slat 106 between tracks 108, a guiding device 117 is installed between support tracks 108 to guide the sealed slat body 106 during its deployment and retraction, while holding it down and preventing lift-off. This guiding device 117 comprises a follower in the form of a roller 118 on an arm 119 attached to the sealed slat body 106, and a fixed slot track 120 for guiding said roller 118. The fixed slot track 120 has the same curvature as the tracks 108 and is placed in the fixed leading edge portion of the wing 101 in front of the front spar 104, therefore not requiring an additional cut-out. The roller 118 is constrained by the slot track 120 inside the wing 101, during deployment, forcing the sealed slat body 106 to conform to wing deformations. This setup is similar to the auxiliary track of U.S. Pat. No. 5,544,847, however, in the present embodiment, since the support tracks 108 are rigidly attached to the sealed slat body 106, the fixed slot track 120, which follows a substantially circular arc substantially centred on the same virtual hinge line as the support tracks 108, will not command a relative pitching motion of the sealed slat body 106 with respect to the support tracks 108 but instead prevent lift-off of the trailing edge 115 of the sealed slat body 106 away from the outer skin 116 of the fixed leading edge of the wing 101.

Locating a guiding device substantially offset between the planes of support tracks is however a solution that can also be used in sealed slat devices with retraction and deployment motions other than substantially circular to allow setting the support tracks further apart, thus saving weight and complication, while preventing a spanwise bending deformation of the sealed slat body relatively to the wing structure. Alternatively, each support track can have a guiding device adjacent to it and another guiding device can be used in addition, substantially offset from said support track and guiding device in order to reduce lift-off by limiting the spanwise length of unsupported body.

Figure 25:
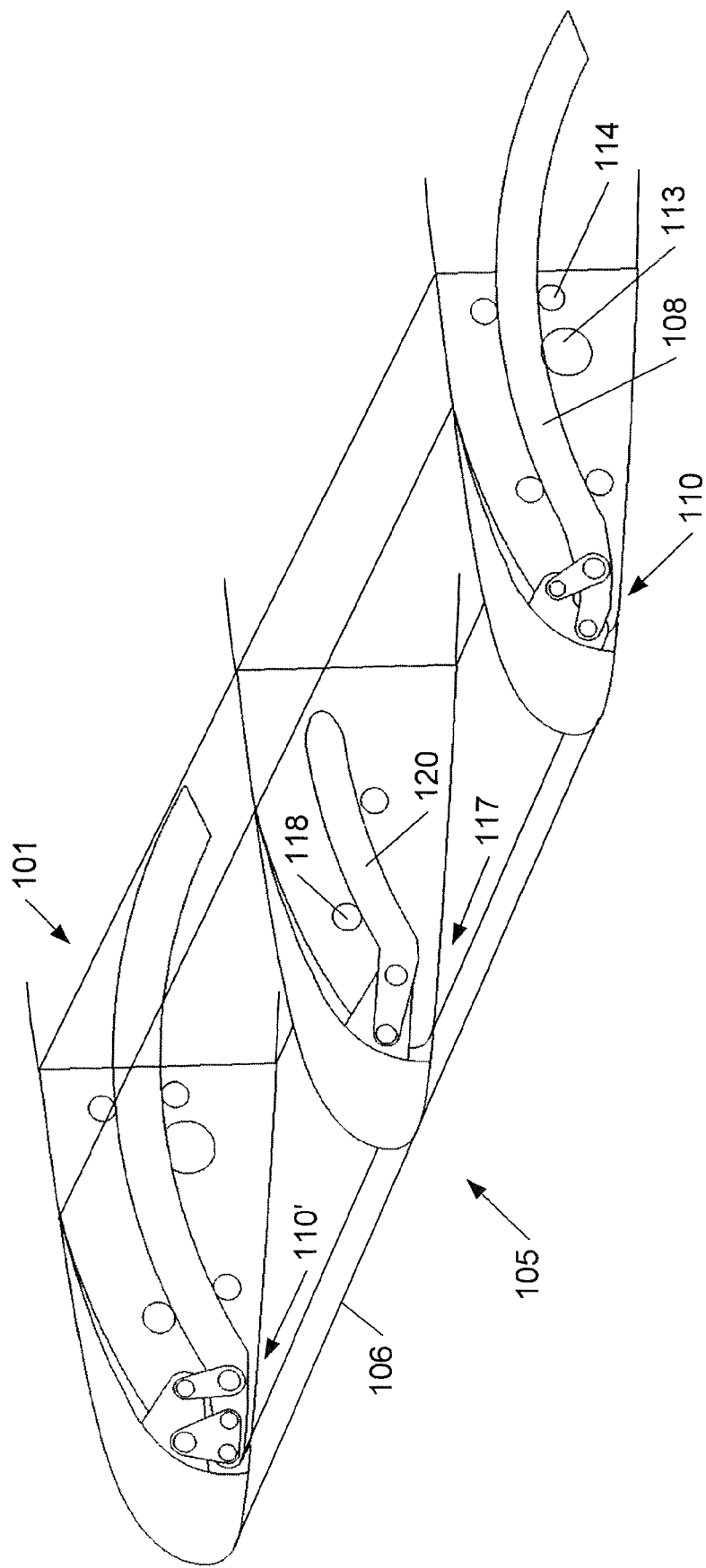
FIGS. 25 and 26 are perspective views of another embodiment where the wing leading edge device is a sealed slat device, in retracted and deployed positions.
Figure 26:
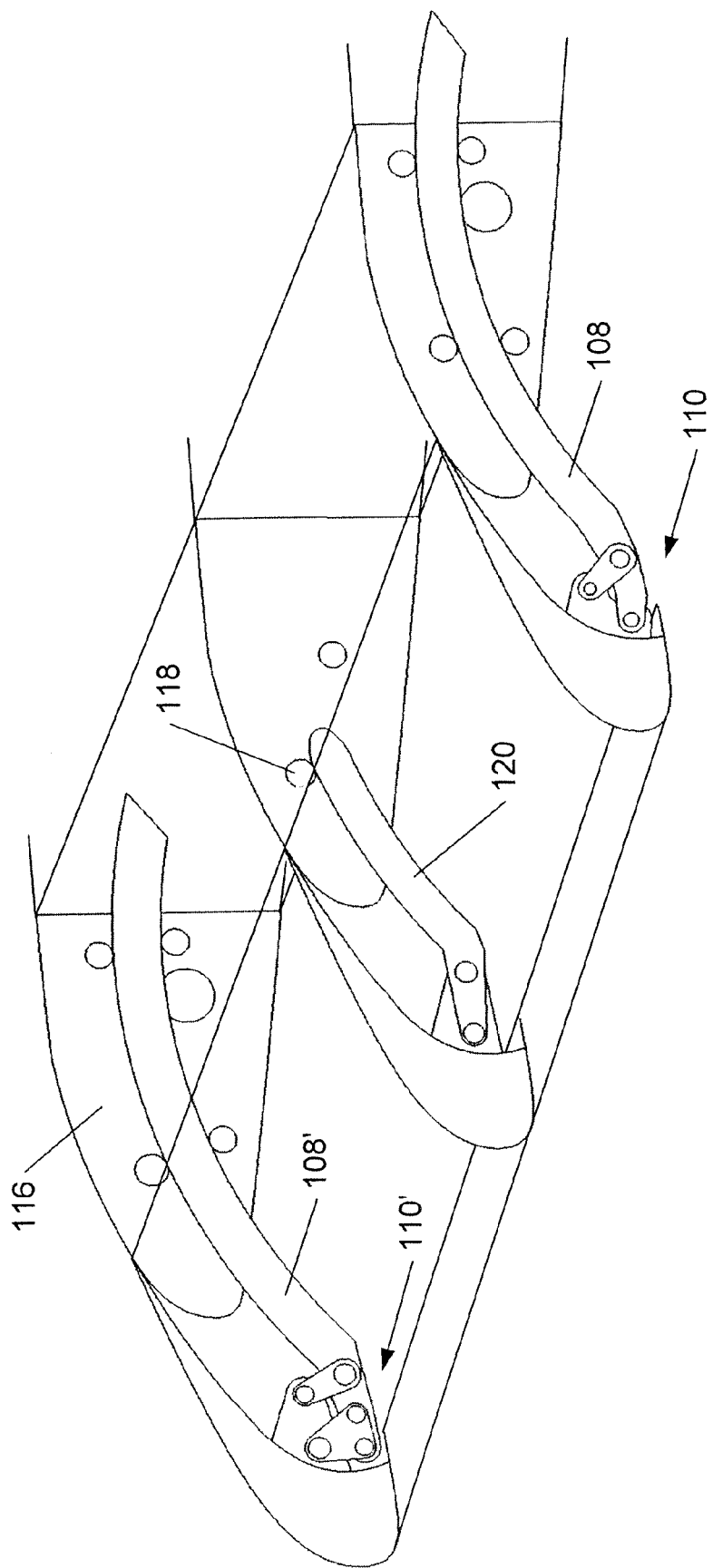

In yet another alternative embodiment, illustrated in FIGS. 25-26, the track 120 of the guiding device 117 is fixed to the sealed slat body 106, whereas the roller 118 is fixed to fixed leading edge portion of the wing 101 in front of the front spar 104. This roller 118 holds the track 120 down, preventing lift-off of the sealed slat body 106 away from the outer skin 116 of the fixed leading edge of the wing 101. Since the roller 118 can have a more reduced diameter than the pinions 113, it can be placed in a more advanced position than said pinions 113 with respect to the front spar 104, and since the track 120 only needs to be in contact with this forward roller 118 in the deployed position of the sealed slat body 106, a track 120 considerably shorter than the support tracks 108, 108' can be used, and no additional cut-out will be required in this station in said front spar 104.

Apart and independently from this aspect, the support and actuation mechanism of this embodiment may comprise two different types of support arms 108, 108', as illustrated in FIGS. 25, 26. Whereas support arms 108 are attached to the sealed slat body 106 with a three-point attachment 110, support arms 108' are attached to the sealed slat body 106 with a more complex, but robust five-point attachment 110'.

Although the present invention has been described with reference to specific exemplary embodiments, it will be evident that various modifications and changes may be made to these embodiments without departing from the broader scope of the invention as set forth in the claims. For instance, at least some of the followers may comprise skids, rather than rollers. Also, the rollers in the guiding devices of wings such as those of the embodiments illustrated in FIGS. 19-26 may also be mounted on eccentric bushings to reduce any play in those guiding devices. Also, while the invention has been illustrated with respect to wings with droop nose and sealed slat leading edge devices, it could be applied to other leading edge devices, such as, for instance, Krueger flap devices. Accordingly, the description and drawings are to be regarded in an illustrative sense rather than a restrictive sense.

The invention claimed is:

1. A wing comprising a wing structure, an outer skin and a leading edge device, said leading edge device comprising:
   a moveable body having a leading and a trailing edge;
   an actuation mechanism comprising a plurality of driven arms for attaching said moveable body to said wing structure, each driven arm having a first extremity, a second extremity, and a hinge located near said first extremity for pivotally attaching each driven arm to said wing structure, each driven arm being attached to said moveable body near said second extremity, said hinges of said plurality of driven arms being substantially aligned with one another and together defining a hinge line, said and actuation mechanism driving said moveable body in a substantially circular motion around said hinge line between a retracted position and at least one deployed position; and
   a support and guiding mechanism comprising a plurality of support arms for attaching said moveable body to said wing structure, each support arm having a hinge for pivotally attaching each support arm to said wing structure, said hinges of said support arms being substantially aligned along said hinge line, and at least one guiding device associated with at least one support arm and which comprises a track and a follower for cooperating with said track, wherein said track and said follower are fixed between said wing structure and said moveable body, said follower being arranged to be guided by said track along a substantially circular arc substantially centered on said hinge line and to hold down said moveable body so as to substantially restrict lift-off of said trailing edge from said outer skin of said wing in said at least one deployed position.

2. A wing according to claim 1, wherein said other one of said track and said follower of said guiding device is fixed to said moveable body closer to said trailing edge than to said leading edge.

3. A wing according to claim 1, wherein at least one support arm is integrally formed with at least part of said moveable body.

4. A wing according to claim 1, wherein at least one support arm is linked to said moveable body with a single point attachment.

5. A wing according to claim 1, wherein at least one support arm is linked to said moveable body with an attachment comprising two eccentrically adjustable pins.

6. A wing according to claim 1, wherein at least one support arm is linked to said moveable body with a three-point attachment, said three-point attachment comprising a linkage providing a first attachment point between said support arm and said linkage and a second attachment point between said linkage and said moveable body, and a third attachment point between said support arm and said moveable body.

7. A wing according to claim 1, wherein said follower of said guiding device is fixed to said moveable body and said track of said guiding device is fixed to said wing structure.

8. A wing according to claim 7, wherein said track of said guiding device is fixed to said wing structure under said outer skin and said follower of the guiding device traverses said outer skin through a cut-out in said outer skin.

9. A wing according to claim 1, wherein said follower comprises a roller having a rotation axis, said roller being mounted on an eccentric bushing, said eccentric bushing providing adjustment for the position of said rotation axis to compensate for play in said guiding device.

10. A wing according to claim 1, wherein said follower comprises a roller having a rotation axis which is pivotable around at least one axis perpendicular to said rotation axis to compensate for angular misalignments in said guiding device.

11. A wing comprising a wing structure, an outer skin and a leading edge device, said leading edge device comprising:
    a moveable body having a leading and a trailing edge,
    an actuation mechanism comprising a plurality of first tracks in substantially parallel planes, each first track comprising a substantially circular arc centered on a point along a virtual hinge line, said first tracks being substantially rigidly attached to said moveable body to support and guide said moveable body while in a motion between a retracted position and at least one deployed position with respect to said wing structure, and
    at least one guiding device located substantially offset between said planes of said first tracks, said at least one guiding device comprising a second track and a follower for cooperating with said second track, wherein said second track and said follower are fixed between said wing structure and said moveable body, said follower being arranged to be guided by said second track in a plane substantially parallel to the planes of the first tracks, said moveable body following a substantially circular motion around said virtual hinge line while in motion between said retracted position and said at least one deployed position.

12. A wing according to claim 11 wherein said follower of said guiding device is fixed to said moveable body and said second track of said guiding device is fixed to said wing structure.

13. A wing according to claim 11, wherein said follower of said guiding device is fixed to said wing structure and said second track of said guiding device is fixed to said movable body.

14. A wing according to claim 2, wherein at least part of said moveable body includes a rib and at least one support arm is integrally formed with said rib.

15. A wing according to claim 4, wherein said single point attachment comprises a spherical bearing.

16. A wing according to claim 1, wherein said follower comprises a roller.

17. A wing according to claim 8, wherein said cut-out in said outer skin is sealed with a spring loaded door seal.

18. A wing according to claim 8, wherein said cut-out in said outer skin is sealed with a sliding curtain seal.

19. A wing according to claim 11, wherein said follower comprises a roller.

* * * * *